US011178462B2

(12) United States Patent
Miyazaki et al.

(10) Patent No.: US 11,178,462 B2
(45) Date of Patent: *Nov. 16, 2021

(54) DISPLAY CONTROL DEVICE AND DISPLAY CONTROL METHOD

(71) Applicant: SONY CORPORATION, Tokyo (JP)

(72) Inventors: Reiko Miyazaki, Tokyo (JP); Takayuki Kaneko, Tokyo (JP); Yukihito Ono, Tokyo (JP); Naoki Saito, Chiba (JP); Seiji Suzuki, Kanagawa (JP); Osamu Shigeta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,266

(22) Filed: Feb. 25, 2020

(65) Prior Publication Data
US 2020/0196017 A1 Jun. 18, 2020

Related U.S. Application Data

(63) Continuation of application No. 16/507,427, filed on Jul. 10, 2019, now Pat. No. 10,674,220, which is a (Continued)

(30) Foreign Application Priority Data

May 30, 2013 (JP) .............................. JP2013-114008

(51) Int. Cl.
H04N 21/4788 (2011.01)
H04N 7/14 (2006.01)
(Continued)

(52) U.S. Cl.
CPC ......... *H04N 21/4788* (2013.01); *G10L 15/26* (2013.01); *H04N 7/142* (2013.01);
(Continued)

(58) Field of Classification Search
CPC combination set(s) only.
See application file for complete search history.

(56) References Cited

U.S. PATENT DOCUMENTS 6,583,808 B2   6/2003   Boulanger et al.
7,814,509 B2   10/2010  Kondo
(Continued)

FOREIGN PATENT DOCUMENTS

CN   102547207 A    7/2012
EP     2437523 A1    4/2012
(Continued)

OTHER PUBLICATIONS

Non-Final Office Action for U.S. Appl. No. 16/507,427, dated Oct. 10, 2019, 34 pages.
(Continued)

*Primary Examiner* — Duc Nguyen
*Assistant Examiner* — Assad Mohammed
(74) *Attorney, Agent, or Firm* — Chip Law Group

(57) ABSTRACT

There is provided a display control device including a user information acquisition unit configured to acquire information on presence of one or more users who are using same content as output content, a user position decision unit configured to decide display positions of the presence of the users with the information on the presence of the users acquired by the user information acquisition unit, and a display control unit configured to exert control to display the information on the presence of the users on the basis of the display positions decided by the user position decision unit in a manner that the users appear to be using the content together.

20 Claims, 14 Drawing Sheets

Related U.S. Application Data continuation of application No. 14/890,211, filed as application No. PCT/JP2014/062953 on May 15, 2014, now abandoned.

(51) Int. Cl.

| | | |
|---|---|---|
| *H04N 21/4223* | (2011.01) | |
| *H04N 21/442* | (2011.01) | |
| *H04N 7/15* | (2006.01) | |
| *H04N 21/414* | (2011.01) | |
| *H04N 21/422* | (2011.01) | |
| *G10L 15/26* | (2006.01) | |

(52) U.S. Cl.
CPC .............. *H04N 7/15* (2013.01); *H04N 7/157* (2013.01); *H04N 21/41407* (2013.01); *H04N 21/4223* (2013.01); *H04N 21/42201* (2013.01); *H04N 21/44218* (2013.01)

(56) References Cited

U.S. PATENT DOCUMENTS

| | | | |
|---|---|---|---|
| 9,113,032 | B1 | 8/2015 | Vander Mey et al. |
| 2003/0005439 | A1* | 1/2003 | Rovira ............... H04N 21/4314 725/37 |
| 2003/0067536 | A1 | 4/2003 | Boulanger et al. |
| 2004/0189701 | A1 | 9/2004 | Badt, Jr. |
| 2005/0078613 | A1 | 4/2005 | Covell et al. |
| 2005/0091680 | A1 | 4/2005 | Kondo |
| 2007/0118831 | A1 | 5/2007 | Kondo |
| 2008/0295035 | A1 | 11/2008 | Mattila et al. |
| 2008/0297436 | A1 | 12/2008 | Oikawa et al. |
| 2009/0276802 | A1 | 11/2009 | Amento et al. |
| 2010/0115426 | A1* | 5/2010 | Liu ....................... G06Q 10/107 715/757 |
| 2010/0316232 | A1 | 12/2010 | Acero et al. |
| 2011/0009241 | A1* | 1/2011 | Lane .................. A63B 24/0087 482/8 |
| 2011/0106912 | A1 | 5/2011 | Onda et al. |
| 2011/0153768 | A1 | 6/2011 | Carter et al. |
| 2011/0169927 | A1* | 7/2011 | Mages ................ G06F 3/04815 348/51 |
| 2011/0267419 | A1 | 11/2011 | Quinn et al. |
| 2012/0038667 | A1 | 2/2012 | Branson et al. |
| 2012/0075405 | A1 | 3/2012 | Sakai et al. |
| 2012/0127284 | A1* | 5/2012 | Bar-Zeev .............. G06T 19/006 348/53 |
| 2012/0154510 | A1 | 6/2012 | Huitema et al. |
| 2012/0204120 | A1 | 8/2012 | Lefar et al. |
| 2012/0274750 | A1 | 11/2012 | Strong |
| 2012/0314077 | A1 | 12/2012 | Clavenna et al. |
| 2013/0083173 | A1 | 4/2013 | Geisner et al. |
| 2013/0155169 | A1 | 6/2013 | Hoover et al. |
| 2013/0241806 | A1* | 9/2013 | Bathiche ............ G02B 27/0179 345/8 |
| 2013/0241920 | A1* | 9/2013 | Yang ....................... A63F 13/87 345/419 |
| 2014/0118472 | A1 | 5/2014 | Liu et al. |
| 2015/0081800 | A1* | 3/2015 | Bills ....................... G06Q 50/01 709/206 |
| 2016/0358283 | A1* | 12/2016 | Regala .................... A63F 13/87 |

FOREIGN PATENT DOCUMENTS

| | | |
|---|---|---|
| GB | 2349055 A | 10/2000 |
| JP | 2005-086422 A | 3/2005 |
| JP | 2008-257709 A | 10/2008 |
| JP | 2008-300983 A | 12/2008 |
| JP | 2009-211528 A | 9/2009 |
| JP | 2010-074668 A | 4/2010 |
| JP | 2010-232860 A | 10/2010 |
| JP | 2012-075038 A | 4/2012 |
| JP | 2012-178028 A | 9/2012 |
| KR | 10-2005-0025912 A | 3/2005 |
| WO | 2005/026488 A1 | 3/2005 |
| WO | 2013/019259 A1 | 2/2013 |

OTHER PUBLICATIONS

Notice of Allowance for U.S. Appl. No. 16/507,427, dated Jan. 27, 2020, 14 pages.
Non-Final Office Action for U.S. Appl. No. 14/890,211, dated Sep. 29, 2016, 24 pages.
Non-Final Office Action for U.S. Appl. No. 14/890,211, dated Sep. 8, 2017, 27 pages.
Non-Final Office Action for U.S. Appl. No. 14/890,211, dated Jun. 13, 2018, 34 pages.
Non-Final Office Action for U.S. Appl. No. 14/890,211, dated May 21, 2019, 39 pages.
Final Office Action for U.S. Appl. No. 14/890,211, dated May 4, 2017, 26 pages.
Final Office Action for U.S. Appl. No. 14/890,211, dated Jan. 25, 2018, 29 pages.
Final Office Action for U.S. Appl. No. 14/890,211, dated Jan. 8, 2019, 40 pages.
Advisory Action for U.S. Appl. No. 14/890,211, dated Jul. 28, 2017, 03 pages.
Advisory Action for U.S. Appl. No. 14/890,211, dated Apr. 5, 2018, 03 pages.
Advisory Action for U.S. Appl. No. 14/890,211, dated Mar. 14, 2019, 03 pages.
Extended European Search Report of EP Application No. 14804185. 8, dated Oct. 25, 2016, 07 pages.
International Search Report and Written Opinion of PCT Application No. PCT/JP2014/062953, dated Jul. 15, 2014, 08 pages of English Translation and 07 pages of ISRWO.
International Preliminary Report on Patentability of PCT Application No. PCT/JP2014/062953, dated Dec. 10, 2015, 08 pages of English Translation and 04 pages of IPRP.

\* cited by examiner

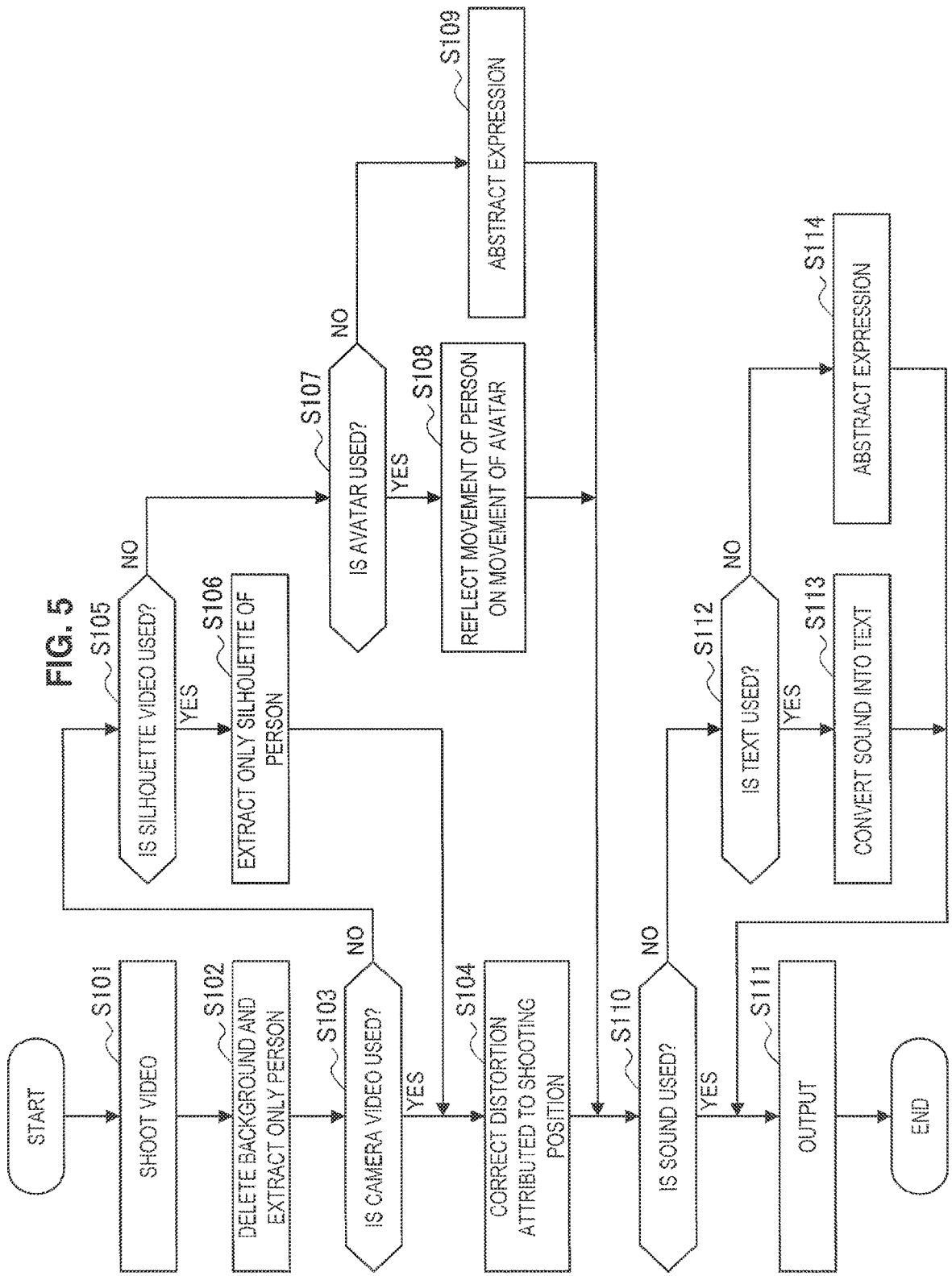

FIG. 6

| USER NAME | OPEN TO | VIDEO SETTING | SOUND SETTING |
|---|---|---|---|
| USER A | USER B | CAMERA | SOUND |
| | USER C | SILHOUETTE | TEXT |
| USER B | USER A | SILHOUETTE | SOUND |
| USER C | EVERYONE | AVATAR | TEXT |

DISPLAY CONTROL DEVICE AND DISPLAY CONTROL METHOD

CROSS-REFERENCE TO RELATED APPLICATION

The present application is a continuation application of U.S. patent application Ser. No. 16/507,427, filed Jul. 10, 2019, which is a continuation application of U.S. patent application Ser. No. 14/890,211, filed Nov. 10, 2015, which is a national stage entry of PCT/JP2014/062953, filed May 15, 2014, and claims the benefit of priority from Japanese Patent Application No. JP 2013-114008, filed May 30, 2013 which are hereby incorporated by reference in their entirety for all purposes.

TECHNICAL FIELD

The present disclosure relates to a display control device, a display control method, and a computer program.

BACKGROUND ART

There is a technique that displays comments posted by users who are reproducing the same content (content refers to images, videos, or a combination of images or videos with sounds) in different places on a display screen of the content to allow for communication between the users. This kind of technique does not allow users to know, on the screen, the presence of users who have not posted any comments, failing to show the scale of the whole audience to users who are trying listening to the content.

For example, Patent Literatures 1 and 2 then disclose techniques of displaying, as the presence of users who are concurrently watching and listening to content, characters called avatars serving as the users themselves and face images to show the scale of the whole audience to the users who are trying listening to the content.

CITATION LIST

Patent Literature

Patent Literature 1: JP 2009-211528A
Patent Literature 2: JP 2008-257709A

SUMMARY OF INVENTION

Technical Problem

Although each of the techniques can show the scale of the whole audience to users who are trying listening to content, the users feel it troublesome in the first place to enter comments to communicate with each other. Text concurrently displayed with content makes the displayed content smaller in size, while text superimposed on content makes the content difficult to watch. When a user would like to watch and listen to content concurrently with a friend while communicating with the friend closely, the user does not know whether or not the other user is looking at the screen, or whether or not the other user can reply soon. Accordingly, the user fails to smoothly communicate with the other user.

The present disclosure then provides a novel and improved display control device, display control method, and computer program that can allow users who are concurrently watching and listening to content to know the scale of the users with ease and allow the users to smoothly communicate with the other users with ease.

Solution to Problem

According to the present disclosure, there is provided a display control device including: a user information acquisition unit configured to acquire information on presence of one or more users who are using same content as output content; a user position decision unit configured to decide display positions of the presence of the users with the information on the presence of the users acquired by the user information acquisition unit; and a display control unit configured to exert control to display the information on the presence of the users on the basis of the display positions decided by the user position decision unit in a manner that the users appear to be using the content together.

In addition, according to the present disclosure, there is provided a display control method including: acquiring information on presence of one or more users who are using same content as output content; deciding display positions of the presence of the users with the acquired information on the presence of the users; and exerting control on the basis of decided display positions to display the information on the presence of the users in a manner that the users appear to be using the content together.

Furthermore, according to the present disclosure, there is provided a computer program for causing a computer to execute: acquiring information on presence of one or more users who are using same content as output content; deciding display positions of the presence of the users with the acquired information on the presence of the users; and exerting control on the basis of decided display positions to display the information on the presence of the users in a manner that the users appear to be using the content together.

Advantageous Effects of Invention

According to the present disclosure as described above, it is possible to provide a novel and improved display control device, display control method, and computer program that can allow users who are concurrently watching and listening to content to know the scale of the users with ease and allow the users to smoothly communicate with the other users with ease.

BRIEF DESCRIPTION OF DRAWINGS

FIG. 5 is an explanatory diagram illustrating an operation example of the content distribution system 1 according to an embodiment of the present disclosure.

FIG. 6 is an explanatory diagram illustrating an example of video distribution setting set in the user information management server 11.

FIG. 7 is an explanatory diagram illustrating that the user information management server 11 distributes a video shot by a display system 100a.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be now made in the following order.
<1. Embodiment of the Present Disclosure>
[Configuration Example of Content Distribution System]
[Configuration Example of Display System]
[Functional Configuration Example of User Information Management Server]
[Functional Configuration Example of Display Control Device]
[Operation Example of Content Distribution System]
<2. Hardware Configuration Example>
<3. Conclusion>

1. Embodiment of the Present Disclosure

Configuration Example of Content Distribution System

Figure 1:
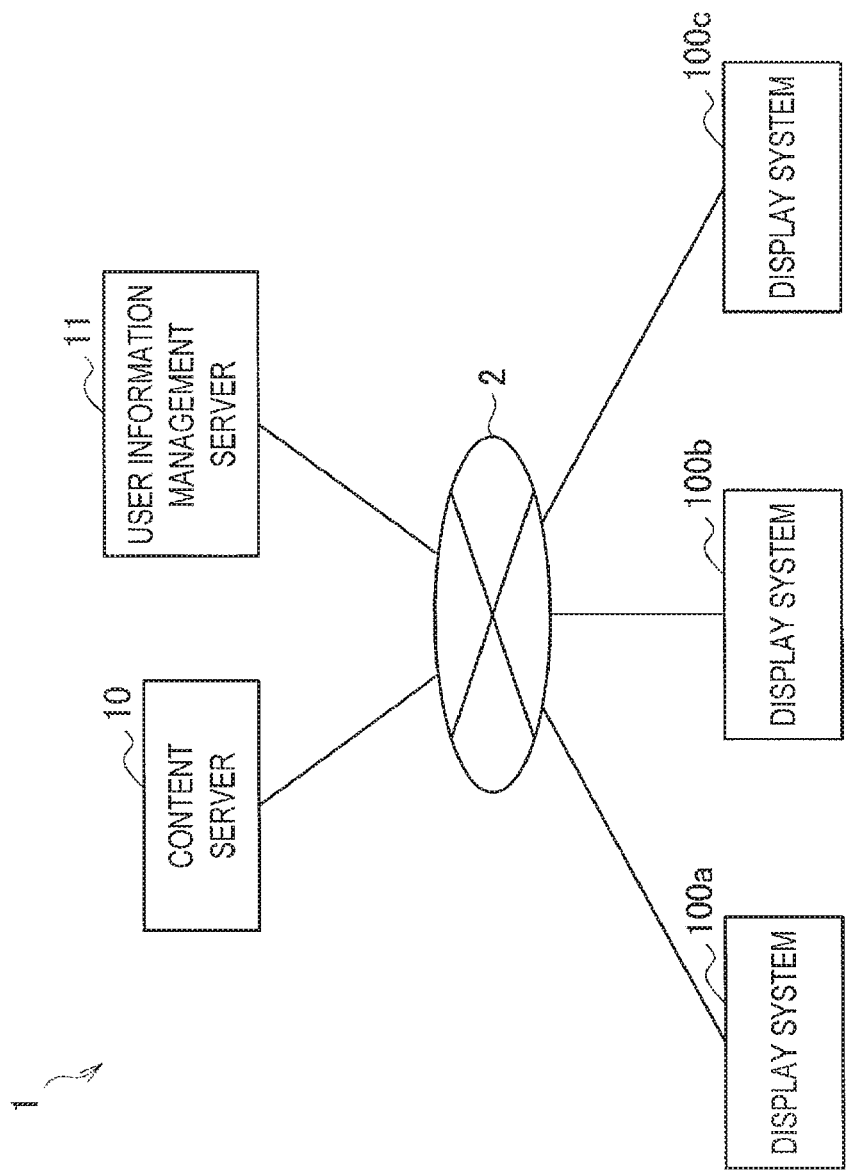
FIG. 1 is an explanatory diagram illustrating a configuration example of a content distribution system 1 according to an embodiment of the present disclosure.

First of all, a configuration example of a system according to an embodiment of the present disclosure will be described with reference to the drawings. FIG. 1 is an explanatory diagram illustrating a configuration example of a content distribution system 1 according to an embodiment of the present disclosure. A configuration example of the content distribution system 1 according to an embodiment of the present disclosure will be described below with reference to FIG. 1.

As illustrated in FIG. 1, the content distribution system 1 according to an embodiment of the present disclosure includes a content server 10, a user information management server 11, and display systems 100a, 100b and 100c. The content server 10, the user information management server 11, and the display systems 100a, 100b and 100c are connected to the Internet and another network 2.

The content distribution system 1 according to an embodiment of the present disclosure distributes the same content (such as images, videos, and a combination of images or videos with sounds) distributed by the content server 10 to the display systems 100a, 100b, and 100c. In addition, the user information management server 11 receives the states of the respective users who are using content, the states being transmitted from the display systems 100a, 100b and 100c, and outputs the received states to the display systems 100a, 100b and 100c in the content distribution system 1 according to an embodiment of the present disclosure. The state of each user may include, for example, the appearance of each user, a silhouette or an avatar generated from the appearance of each user, and the voice of each user. The use of content refers to each user's watching content to be distributed. The use of content also means that each user waits for content to start even if the content has not yet been distributed in practice. The use of content includes a situation in which users exchange their opinions on content even after the distribution of the content ends. When there is no need to distinguish the display systems 100a, 100b, and 100c from each other, they will be simply represented as the display system 100 in the following description.

The content server 10 retains content to be distributed to the display system 100a, 100b and 100c, and outputs the retained content to the network 2. For example, the content server 10 may begin to output the retained content at the predefined time. The display system 100 can access the content output by the content server 10 at that time, thereby reproducing the content output by the content server 10. It will be described in the present embodiment that content is distributed from the content server 10 to the display systems 100a, 100b and 100c via the network 2, but the present disclosure is not limited to such an example. For example, content may also be distributed to the display systems 100a, 100b and 100c via broadcast waves.

The content server 10 may retain and distribute various genres of content to the display systems 100a, 100b and 100c. Examples of genres of content retained and distributed to the display systems 100a, 100b and 100c by the content server 10 may include sports, movies, concerts, quizzes, dramas, variety shows, games, still images and moving images shot by users themselves, and other private content.

The user information management server 11 is a device that manages information on users of the display systems 100a, 100b and 100c who uses the content distribution system 1. The user information management server 11 outputs information sent from each of the display systems 100a, 100b and 100c to the display systems 100a, 100b and 100c on the basis of retained user information.

The display system 100 acquires content output by the content server 10 from the network 2 and displays the acquired content, or acquires information transmitted from the user information management server 11 and displays the acquired information. Although a configuration example of the display system 100 will be described below in detail, the display system 100, in simple terms, includes a content display device that displays content output by the content server 10 and a user information output device that outputs information transmitted from the user information management server 11.

A configuration example of the content distribution system 1 according to an embodiment of the present disclosure has been described so far with reference to FIG. 1. Next, a configuration example of the display system 100 according to an embodiment of the present disclosure will be described.

Configuration Example of Display System

Figure 2:
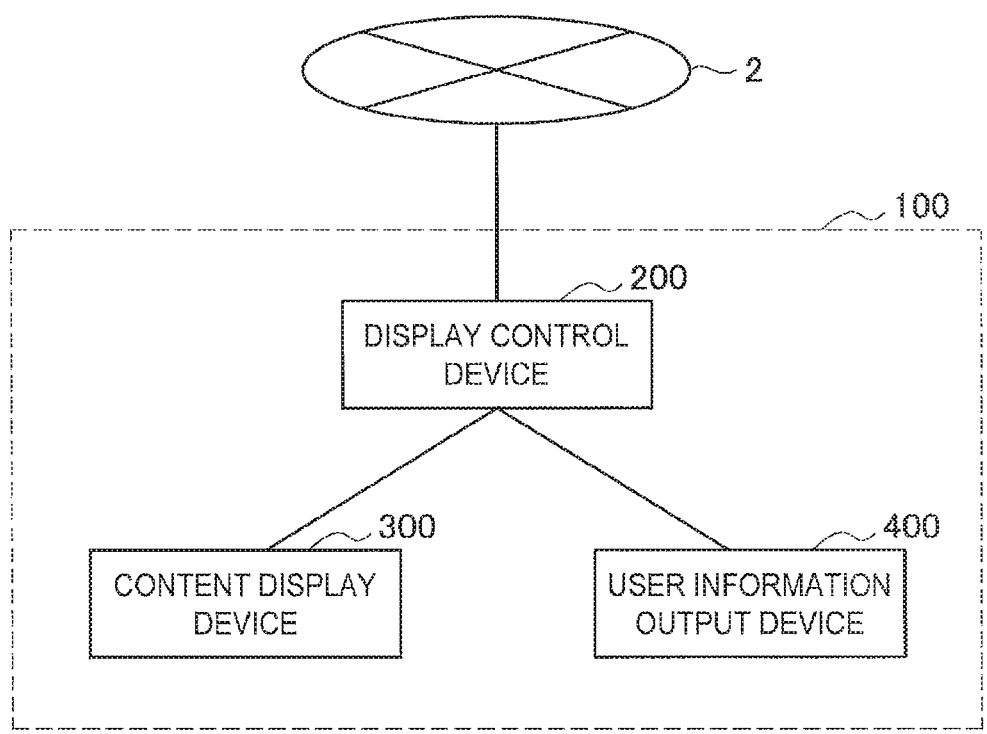
FIG. 2 is an explanatory diagram illustrating a configuration example of a display system 100 according to an embodiment of the present disclosure.

FIG. 2 is an explanatory diagram illustrating a configuration example of a display system 100 according to an embodiment of the present disclosure. A configuration example of the display system 100 according to an embodiment of the present disclosure will be described below with reference to FIG. 2.

As illustrated in FIG. 2, the display system 100 according to an embodiment of the present disclosure includes a display control device 200, a content display device 300, and a user information output device 400.

The display control device 200 controls the content display device 300 displaying content and the user information output device 400 displaying user information. The display control device 200 acquires content output by the content server 10 from the network 2, and outputs the acquired content to the content display device 300. In addition, the display control device 200 acquires user information output by the user information management server 11 from the network 2, and outputs the acquired user information to the user information output device 400.

The content display device 300 displays content output by the content server 10, and includes a liquid crystal display device, an organic EL display device, or another display device. The content display device 300 acquires content output by the content server 10 from the display control device 200, and displays the acquired content on the basis of control exerted by the display control device 200.

The user information output device 400 acquires and outputs information transmitted from the user information management server 11, and includes a device such as a projector that irradiates, for example, a wall with a video. The user information output device 400 acquires information transmitted from the user information management server 11 from the display control device 200, and outputs the acquired information on the basis of control exerted by the display control device 200.

Examples of information output by the user information output device 400 may include the appearance of another user, a silhouette, a face picture, an avatar and other video information, voice and other audio information, and a comment entered by another user and other text information. The user information output device 400 outputs such a kind of information on the basis of control exerted by the display control device 200.

The user information output device 400 may also include a camera for shooting a video of the appearance of a user who is trying listening to content displayed by the content display device 300, and a microphone for collecting the voice of the user. In addition, the user information output device 400 may also include a speaker for outputting content displayed by the content display device 300 and a sound uttered by another user. Additionally, these camera, microphone, and speaker may be provided independently from the content display device 300 and the user information output device 400. Let us assume below that the user information output device 400 includes a camera for shooting a video of the appearance of a user, a speaker for outputting content displayed by the content display device 300 and a sound uttered by another user, and a microphone for collecting the voice of the user.

The user information output device 400 may also include an infrared sensor device, an ultrasonic sensor device, or another distance measuring sensor for acquiring distance information on the distance to a user trying listening to content displayed by the content display device 300. Once the user information output device 400 acquires distance information on the distance to a user, the user information output device 400 may transmit the distance information to the user information management server 11 via the network 2.

The display system 100 according to an embodiment of the present disclosure may also include a global positioning system (GPS) sensor or another position sensor for acquiring the present position. The position sensor only has to be provided in any of the display control device 200, the content display device 300 and the user information output device 400, and the display system 100 may transmit information on the present position acquired by the position sensor to the user information management server 11 via the network 2.

Figure 3:
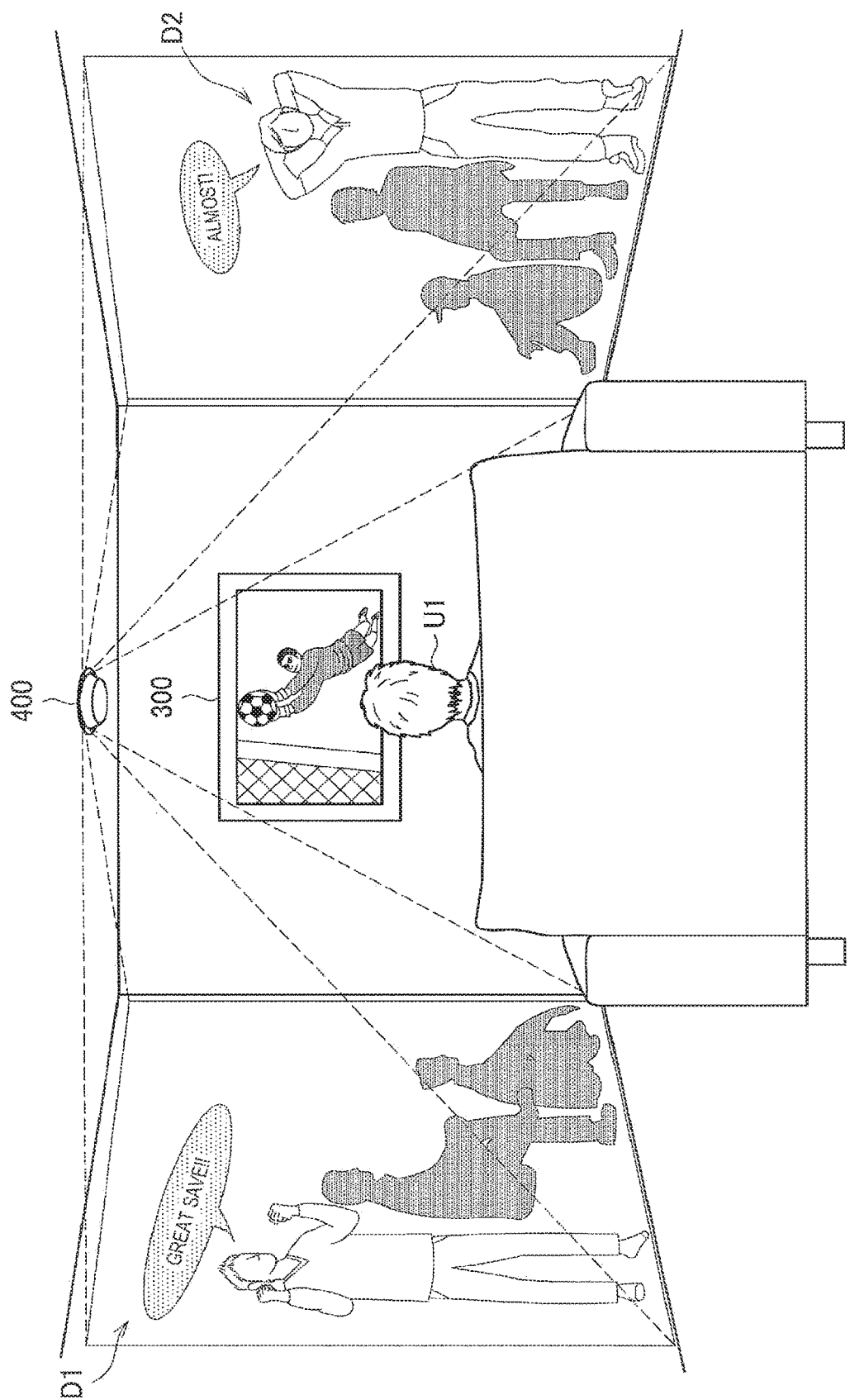
FIG. 3 is an explanatory diagram illustrating an example in which a content display device 300 and a user information output device 400 according to an embodiment of the present disclosure display content and user information.

FIG. 3 is an explanatory diagram illustrating an installation example of the user information output device 400. The user information output device 400 may also be provided on the ceiling of a room or at a position at which the user information output device 400 faces a user as illustrated in FIG. 3 in order to irradiate a wall with a video or shoot a video of the appearance of the user. A camera provided on the user information output device 400 may be provided at a position that allows the camera to shoot at least a video of the upper body of a user while the user is using (watching) content displayed by the content display device 300. As long as a video of the upper body of a user can be shot, it is possible, for example, with the skeleton estimation technology to estimate the posture of the user. Accordingly, for example, the user information management server 11 can acquire information on the posture of the user by using that skeleton estimation technology. Furthermore, for example, the user information management server 11 can convert even a shot video showing the front of the user as illustrated in FIG. 3 to a video showing a side of the user.

The display control device 200 can show the scale of users who are concurrently using (watching) content to a user of the display system 100 with ease by controlling the content display device 300 displaying content and the user information output device 400 outputting information. In addition, the display control device 200 exerts such control, thereby allowing a user of the display system 100 to smoothly communicate with another user with ease.

The following describes an example in which the content display device 300 and the user information output device 400 display content and user information. FIG. 3 is an explanatory diagram illustrating an example in which a content display device 300 and a user information output device 400 according to an embodiment of the present disclosure display content and user information.

As illustrated in FIG. 3, a user U1 sits in a room watching and listening to content displayed by the content display device 300. The user information output device 400 projects appearances D1 and D2 of other users onto walls of the room where the user 1 is as illustrated in FIG. 3. If the user information output device 400 projects the appearances D1 and D2 of the other users in this way, the display system 100 can present information on the other users to the user U1 without preventing the user U1 from watching and listening to content displayed by the content display device 300.

The appearances D1 and D2 of the other users projected by the user information output device 400 may include videos of the actual appearances of the other users shot by the display systems 100 used by the other users, or silhouettes made from the appearances. In addition, the user information output device 400 may project, as the appearances D1 and D2 of the other users, images of characters called avatars converted from videos of the appearances of the other users shot by the display systems 100 used by the other users. The display manner and display positions of the appearances D1 and D2 of the other users projected by the user information output device 400 for the respective users change in accordance with control exerted by the display control device 200. Some parts of the appearances of the other users are displayed as shot videos, and the other parts are displayed as silhouettes in accordance with control exerted by the display control device 200 in the example illustrated in FIG. 3.

The appearances of the other users may be converted to silhouettes, or avatar information on the other users may be acquired by the user information management server 11. The user information management server 11 may also convert a video of a user transmitted from the display system 100 to a silhouette, or acquire an avatar of a user on the basis of the retained user information.

The user information output device 400 may output sounds uttered by the other users in addition to the appearances D1 and D2 of the other users. The user information output device 400 may also output text generated from the sounds uttered by the other users. The user information output device 400 outputs text "GREAT SAVE!!" and "ALMOST!" generated from sounds uttered by the other users in balloons in the example illustrated in FIG. 3.

The display control device 200 may change the projection positions of the appearances D1 and D2 of the other users and the display positions of the respective users in accordance with information managed by the user information management server 11 and the details of content output by the content display device 300. A specific example of display control exerted by the display control device 200 on the appearances D1 and D2 of the other users will be described below in detail.

The user information output device 400 may display the appearances of the other users as illustrated in FIG. 3 before the content display device 300 displays content. The user information output device 400 can show that users have been excited even before the content display device 300 displays content, by displaying the appearances of the other users before the content display device 300 displays the content.

The user information output device 400 may continue to display the appearances of the other users as illustrated in FIG. 3 even after the content display device 300 finishes displaying content. The user information output device 400 can show that users have been excited even after the content display device 300 finishes displaying content, by continuing to display the appearances of the other users after the content display device 300 finishes displaying the content.

If a user of the display system 100 enjoys game content with another user, the display control device 200 illustrated in FIG. 2 may be configured to output the game content to the content display device 300. If a user of the display system 100 enjoys game content with another user, the display system 100 may include a controller for operating the game, which is not, however, illustrated in FIG. 2.

A configuration example of the display system 100 according to an embodiment of the present disclosure has been described so far with reference to FIG. 2. Next, a functional configuration example of the user information management server 11 according to an embodiment of the present disclosure will be described.

Functional Configuration Example of User Information Management Server

Figure 4A:
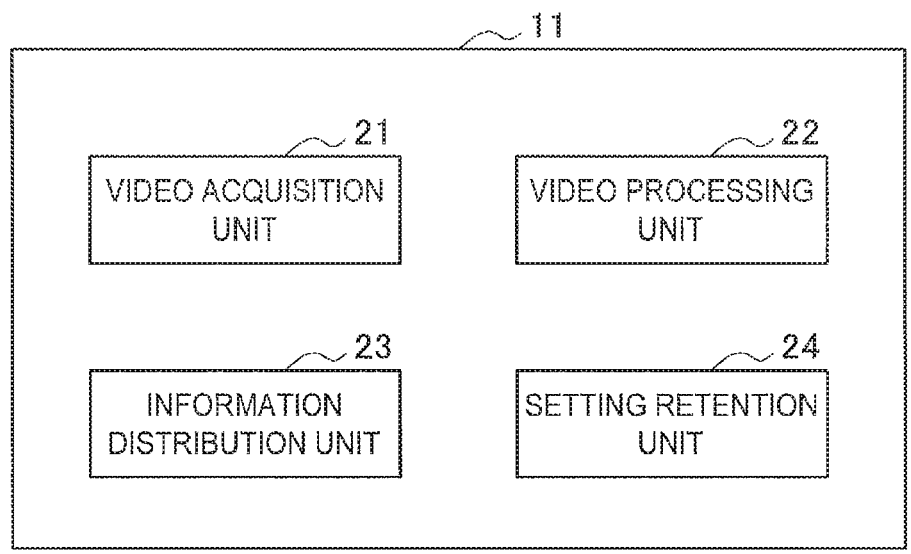
FIG. 4A is an explanatory diagram illustrating a functional configuration example of a user information management server 11 according to an embodiment of the present disclosure.

FIG. 4A is an explanatory diagram illustrating a functional configuration example of the user information management server 11 according to an embodiment of the present disclosure. Next, a functional configuration example of the user information management server 11 according to an embodiment of the present disclosure will be described with reference to FIG. 4A.

As illustrated in FIG. 4A, the user information management server 11 according to an embodiment of the present disclosure includes a video acquisition unit 21, a video processing unit 22, an information distribution unit 23, and a setting retention unit 24.

The video acquisition unit 21 acquires a video shot by the user information output device 400 included in the display system 100. The video shot by the display system 100 may include the appearance of a user who uses the display system 100. The video acquired by the video acquisition unit 21 is subjected to video processing by the video processing unit 22.

The video processing unit 22 executes video processing on the video acquired by the video acquisition unit 21. The video processing executed by the video processing unit 22 may include, for example, deleting the background from a video, extracting a person from a video, converting the extracted person to a silhouette, and reflecting the movement of the extracted person on an avatar. The video processing unit 22 executes video processing on the video acquired by the video acquisition unit 21 on the basis of the content of the setting retained by the setting retention unit 24. Additionally, the video processing unit 22 may also execute processing on a sound that may be included in the video in addition to the processing on the video. For example, the video processing unit 22 may also execute processing of converting a sound included in the video into text data on the basis of the content of the setting retained by the setting retention unit 24 discussed below.

The information distribution unit 23 distributes the video transmitted form the display system 100 and subjected to video processing by the video processing unit 22 to another display system 100. The information distribution unit 23 distributes the video transmitted from the display system 100 to another display system 100 on the basis of the content of the setting retained by the setting retention unit 24.

The setting retention unit 24 retains, for example, the content of the video processing on the video shot by the display system 100, the content of the setting for a destination to which the video is distributed, and the setting for information on each user who is using the display system 100. As discussed above, the video processing unit 22 and the information distribution unit 23 operates on the basis of the content of the setting retained by the setting retention unit 24. Additionally, although the setting retention unit 24 is provided in the user information management server 11 in the example illustrated in FIG. 4A, the present disclosure is not limited to such an example.

A functional configuration example of the user information management server 11 according to an embodiment of the present disclosure has been described so far with reference to FIG. 4A. Next, a functional configuration example of the display control device 200 according to an embodiment of the present disclosure will be described.

Functional Configuration Example of Display Control Device

Figure 4B:
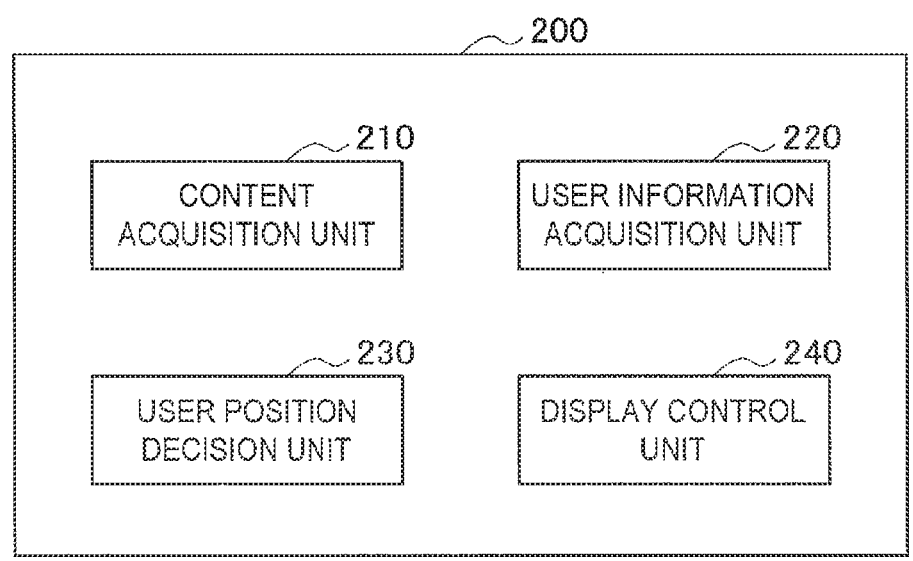
FIG. 4B is an explanatory diagram illustrating a functional configuration example of a display control device 200 according to an embodiment of the present disclosure.

FIG. 4B is an explanatory diagram illustrating a functional configuration example of the display control device 200 according to an embodiment of the present disclosure. The following describes a functional configuration example of the display control device 200 according to an embodiment of the present disclosure with reference to FIG. 4B.

As illustrated in FIG. 4B, the display control device 200 according to an embodiment of the present disclosure includes a content acquisition unit 210, a user information acquisition unit 220, a user position decision unit 230, and a display control unit 240.

The content acquisition unit 210 acquires content output by the content server 10. The content acquired by the content acquisition unit 210 is sent to the content display device 300 by the display control unit 240, and the display control unit 240 controls the content display device 300 displaying the acquired content.

The user information acquisition unit 220 acquires information transmitted from the user information management server 11. The information acquired by the user information acquisition unit 220 is sent to the user information output device 400 by the display control unit 240. The display control unit 240 then controls the user information output device 400 outputting the information acquired by the user information acquisition unit 220.

The user position decision unit 230 decides the position of the appearance of a user output from the user information output device 400 when the information acquired by the user information acquisition unit 220 is output from the user information output device 400. The user position decision unit 230 may use a variety of indexes for deciding the position of the appearance of a user output from the user information output device 400. For example, the user position decision unit 230 may decide the position on the basis of information on a user of the display control device 200 and another user managed by the user information management server 11. Meanwhile, for example, the user position decision unit 230 may decide the position in accordance with the details of content output by the content server 10. For example, if the content server 10 outputs baseball content, the user position decision unit 230 may decide the display positions of the appearances of users in a manner that a user who is rooting for the same team as a team that a user of the display control device 200 is rooting for is displayed on the same wall and a user who is rooting for the opponent team is displayed on the opposite wall. Meanwhile, for example, if the content server 10 outputs content of an online game that falls into a role playing game, the user position decision unit 230 may decide the display positions of the appearances of users in a manner that users who are using characters having the same job are centralized on one of the walls.

Specific examples of indexes used by the user position decision unit 230 will be described. If a user who is using the display system 100 sets the appearance of a user registered in advance in the user information management server 11 in a manner that the registered appearance is displayed near the user who is using the display system 100, the user position decision unit 230 may make a decision in a manner that the display position of the registered appearance of the user is located near the user who is using the display system 100 on the basis of the setting. The position of a user in a room may be acquired, for example, from a resulting video of the user shot by the user information output device 400 or acquired by a sensor or the like that measures the distance to an object. The user position decision unit 230 may decide the position of another user on the basis of information on the position of the user acquired in this way.

If the user position decision unit 230 can use information on user communication services such as social networking services (SNSs), social media, and social networking sites, the user position decision unit 230 may make a decision in a manner that the display position of the appearance of a user who has deep intimacy as estimated from a social graph of the SNS is located near a user who is using the display system 100.

Meanwhile, if the content server 10 outputs content of sports broadcast, the user position decision unit 230 may make a decision in a manner that the display position of the appearance of a user who is rooting for the same team as a team that a user who is using the display system 100 is rooting for is located near the user who is using the display system 100.

If the content server 10 outputs content of sports broadcast, the user position decision unit 230 may display the appearances of users in a manner that the display position of the appearance of a user who is rooting for the same team as a team that a user who is using the display system 100 is rooting for is located on the right side as viewed from the user who is using the display system 100 and the display position of the appearance of a user who is rooting for the opponent team is located on the left side as viewed from the user who is using the display system 100.

If the content server 10 outputs content of a quiz program, the user position decision unit 230 may display the appearances of users in a manner that the display position of the appearance of a user who gets the same answer as an answer of a user who is using the display system 100 is located on the right side as viewed from the user who is using the display system 100 and the display position of the appearance of a user who gets a different answer is located on the left side as viewed from the user who is using the display system 100.

The user position decision unit 230 may change the display position of the appearance of another user in accordance with the posture of the user. For example, when there are a user sitting on the floor, a user sitting on a chair, and a standing user, the user position decision unit 230 may display the appearance of the user sitting on the floor at the front, the appearance of the user sitting on a chair in the middle, and the appearance of the standing user at the back.

The user position decision unit 230 may change the display position of the appearance of another user in accordance with the height of the user. The user information management server 11 estimates the height of a user who is using the display system 100 from the appearance of the user, whose video has been shot by the user information output device 400. The user information management server 11 may then put together information on the heights of users who are watching and listening to the same content and provide the information to the respective display systems 100. For example, the user position decision unit 230 may display the appearances of the users in order of increasing height.

The user position decision unit 230 may change the display position of the appearance of another user in accordance with the actual distance to the other user. As discussed above, the display system 100 may include a position sensor that acquires the present position. The display system 100 includes a position sensor, so that position information on a user of the display system 100 and position information on another user are gathered in the user information management server 11. Thus, if the display control device 200 acquires position information on other users from the user information management server 11, it is possible to change the display positions of the appearances of the users in accordance with the actual distances to the other users. For example, the user position decision unit 230 may display the appearances of other users in order of increasing actual distance to the users.

In addition, the user position decision unit 230 may also change the display position of the appearance of another user in accordance with the distance between the content display device 300 of the display system 100 used by the user and the user. The user information output device 400 may also include an infrared sensor device, an ultrasonic sensor device, or another distance measuring sensor for acquiring distance information on the distance to a user trying listening to content displayed by the content display device 300. Thus, the user information output device 400 includes a distance measuring sensor device, so that information on the distances between the content display devices 300 and users is gathered in the user information management server 11. For example, the user position decision unit 230 may display the appearances of other users in order of increasing distance between the content display devices 300 of the display systems 100 used by the users and the users.

The display control unit 240 controls the content display device 300 displaying content acquired by the content acquisition unit 210. In addition, the display control unit 240 controls the user information output device 400 outputting information acquired by the user information acquisition unit 220. The display control unit 240 exerts control in a manner that the user information output device 400 outputs information on the position of each user decided by the user position decision unit 230 as the information acquired by the user information acquisition unit 220.

When displaying the information acquired by the user information acquisition unit 220, the display control unit 240 may change what is to be displayed in accordance with the state of another user. For example, the display control unit 240 may stop the user information output device 400 from outputting the appearance of another user or cause the user information output device 400 to output only the outline of the user in the absence of the user. Additionally, the absence of another user may be determined, for example, from the user stepping out from the video shooting range of the user information output device 400, or the other user telling that the user is going to be unavailable through a microphone provided on the user information output device 400.

If another user who has been sat for a long time stands up, the display control unit 240 may determine that the user leaves his or her seat and stop the user information output device 400 from outputting the appearance of the user or cause the user information output device 400 to output only the outline of the user.

In addition, the display control unit 240 may change what is displayed for another user in accordance with a sign shown by the user. For example, the display control unit 240 may stop the user information output device 400 from outputting the appearance of another user or cause the user information output device 400 to output only the outline of the user when the user explicitly shows a sign indicating that the user leaves a seat.

Furthermore, the display control unit 240 may display a user who actively leaves messages and a user who does not in different manners. For example, the display control unit 240 may display users who actively leave messages near a user of the display control device 200 or centralize and display them on one of the walls, while displaying users who have been leaving only a certain threshold amount of messages or less within a predetermined time, or who have been leaving no messages for a predetermined time far from the user of the display control device 200 or displaying them on the opposite wall to the wall on which the users who actively leave messages are displayed.

The display control unit 240 may change information on a user output by the user information output device 400 in accordance with a change in the situation in content output by the content server 10. For example, when the content server 10 outputs baseball content and the user position decision unit 230 decides the display positions in a manner that users who are rooting for the same team as a team that a user of the display control device 200 is rooting for are displayed on the same wall, the display control unit 240 may display the users who are rooting for the same team as a team that the user of the display control device 200 is rooting for with such an effect that makes the users look excited about the team that the users are rooting for getting ahead. To the contrary, when the team that the users are rooting for gets behind, the display control unit 240 may display the users who are rooting for the same team as a team that the user of the display control device 200 is rooting for with such an effect that makes the users look down or may reduce the sizes of the users.

Meanwhile, for example, when the content server 10 outputs content of a quiz program, the user information output device 400 may display a user who gets the right answer of a quiz with such an effect that makes the user look excited under the control of the display control unit 240. Meanwhile, for example, when the content server 10 outputs content of a quiz program as mentioned above, the user information output device 400 may display a user who gets an incorrect answer of a quiz by making the user look down or reducing the size of the appearance of the user under the control of the display control unit 240.

Furthermore, for example, when the content server 10 outputs content of an online game, the user information output device 400 may output information on a user changed in accordance with the situation in the online game. When the online game is a roll playing game, the user information output device 400 may centralize and display users who are, for example, using characters having the same job on one of the walls under the control of the user position decision unit 230. When the online game is a roll playing game, the user information output device 400 may also reduce the sizes of the users whose characters are, for example, run out of health points under the control of the display control unit 240.

The display control device 200 according to an embodiment of the present disclosure is configured as illustrated in FIG. 4B, and can hereby show a user of the display system 100 with ease the scale of users who are concurrently watching and listening to content. In addition, the display control device 200 according to an embodiment of the present disclosure is configured as illustrated in FIG. 4B, thereby allowing users of the display systems 100 to smoothly communicate with other users with ease.

Additionally, the display control exerted by the display control unit 240 may be exerted by the user information management server 11. If the user information management server 11 exerts the display control and then transmits user information to the display system 100, the display control unit 240 can exert control in a manner that the processed user information sent from the user information management server 11 is output from the user information output device 400.

When the user information management server 11 exerts display control, the display control unit 240 may gather information transmitted from the plurality of display systems 100 and subject the information to video processing in the video processing unit 22 to transmit the information on users subjected to the video processing for each display system 100.

A functional configuration example of the display control device 200 according to an embodiment of the present disclosure has been described so far. Next, an operation example of the content distribution system 1 according to an embodiment of the present disclosure will be described.

Operation Example of Content Distribution System

As discussed above, the content distribution system 1 according to an embodiment of the present disclosure outputs content from the content server 10 to the display system 100, and outputs a video and sound of a user sent from the display system 100 from the user information management server 11 to another display system 100.

It may be decided in what manner the display system 100 outputs a video and sound of a user, on the basis of information retained by the user information management server 11. The following describes an operation example in which it is decided in what manner the display system 100 outputs a video and sound of a user.

FIG. 5 is an explanatory diagram illustrating an operation example of the content distribution system 1 according to an embodiment of the present disclosure. An operation example of the content distribution system 1 according to an embodiment of the present disclosure will be described below with reference to FIG. 5.

Each display system 100 shoots a video of the appearance of a user who is using the display system 100 with a camera provided on the user information output device 400 (step S101), and transmits the video to the user information management server 11 via the network 2. This video may include a sound uttered by the user. The user information management server 11 receives the video transmitted from each display system 100, and then deletes the background from the received video and extracts only a person (step S102).

The content distribution system 1 according to an embodiment of the present disclosure goes on to decide how the video shot by any one of the display systems 100 is output by another display system 100, on the basis of information managed in the user information management server 11. The following describes an example in which the user information management server 11 decides a manner in which a video is output on the basis of information managed in the user information management server 11 and distributes the video to each display system 100. The display system 100 may naturally execute the following processing instead of the user information management server 11, or the user information management server 11 may divide the processing with the display system 100.

The user information management server 11 determines whether or not a video shot by any one of the display systems 100 is set to be output by another display system 100 without any processing (step S103). If the video is set to be output without any processing, the user information management server 11 corrects video distortion attributed to a shooting position in the video shot by the one of the display systems 100 (step S104).

The appearance of another user is output from the user information output device 400, for example, as illustrated in FIG. 3. Thus, if the appearance of a person is extracted from a video shot by any one of the display systems 100 and then output by another display system 100 without any processing, the appearance of the other user does not look at the content display device 300 in some cases. Accordingly, the user information management server 11 corrects the video on the basis of the position of the content display device 300 and the position of the other user to be output, making the appearance of the other user look at the content display device 300. The information on the position of the content display device 300 may be acquired, for example, by a camera or a distance measuring sensor of the user information output device 400, and transmitted to the user information management server 11. Alternatively, the information on the position of the content display device 300 may be registered by a user, and transmitted to the user information management server 11.

To the contrary, if the video is not set to be output without any processing, the user information management server 11 goes on to determine whether or not the video shot by the one of the display systems 100 is set to be converted to a silhouette and the silhouette video is set to be output from another display system 100 (step S105). If the silhouette video is set to be output as the video shot by the one of the display systems 100, the user information management server 11 extracts only a silhouette of a person from the video shot by the one of the display systems 100 (step S106). After extracting a silhouette, the user information management server 11 corrects the video distortion attributed to the shooting position as discussed above (step S104).

Some position of a user may disable a camera provided in the user information output device 400 from encompassing the entire body of the user in a shot video of the appearance of the user. In such a case, the user information management server 11 may execute video processing in the video processing unit 22 to compensate for a part of the body which does not appear in the video.

If a result of the determination in step S105 shows that the silhouette video is not set to be output, the user information management server 11 goes on to determine whether or not the appearance of a person appearing in the video shot by the one of the display systems 100 is set to be changed into an avatar and output by another display system 100 (step S107). If the appearance is set to be changed into an avatar and output, the user information management server 11 reflects the movement of the person appearing in the video shot by the one of the display systems 100 on the movement of the avatar (step S108).

It will be described that the appearance of a user whose video is shot by the display system 100a is changed into an avatar and output to the display system 100b by the user information management server 11. If a user whose video is shot by the display system 100a raises his or her right hand, the user information management server 11 makes such an output to the display system 100 that causes a character displayed as the avatar to raise its right hand. Meanwhile, if a user whose video is shot by the display system 100a smiles, the user information management server 11 causes a character displayed as the avatar to smile and outputs the character to the display system 100b.

If a result of the determination in step S107 shows that the appearance is not set to be changed into an avatar and output, the user information management server 11 goes on to determine whether or not the appearance of a person appearing in a video shot by the one of the display systems 100 is set to be changed into an abstract expression and output (step S109). Examples of the abstract expression may include simplification of the appearance of a person. The appearance of a person may be expressed, for example, as not the appearance of the person, but a figure.

The user information management server 11 goes on to determine whether or not a sound included in a video shot by any one of the display systems 100 is set to be output by another display system 100 without any processing (step S110). If the sound included in the video is set to be output without any processing, the user information management server 11 outputs the sound included in the video shot by the one of the display systems 100 to another display system 100 without any processing in accordance with the video output setting (step S111).

If the sound is not set to be output without any processing, the user information management server 11 goes on to determine whether or not the sound included in the video shot by the one of the display systems 100 is set to be converted into text and output by another display system 100 (step S112). If the sound included in the video is set to be converted into text and output, the user information management server 11 converts the sound included in the video shot by the one of the display systems 100 into text (step S113). The sound may be converted into text, for example, by the video processing unit 22. The user information management server 11 then outputs the text converted from the sound included in the video to another display system 100 in accordance with the video output setting (step 111).

If the sound included in the video is not set to be converted into text and output, the user information management server 11 changes the sound included in the video shot by the one of the display systems 100 into an abstract expression and outputs the abstract expression to another display system 100 (step S114). Examples of the abstract expression may include a symbol or a figure that has nothing to do with the sound. The display system 100 then outputs the abstract expression converted from the sound in accordance with the video output setting (step S111).

The video processing and the audio processing may be executed by not the user information management server 11, but the display control device 200. When the display control device 200 executes the video processing and the audio processing, the display control device 200 refers to the setting retained by the user information management server 11 and exerts control to display the appearance and a sound of another user.

A specific example of the processing will be described along with a setting example of the user information management server 11. The following describes an example in which the content distribution system 1 includes at least three display systems 100a, 100b and 100c as illustrated in FIG. 1, and the video distribution setting of the respective display systems 100a, 100b and 100c is set in the user information management server 11. A user who is using the display system 100a, a user who is using the display system 100b, and a user who is using the display system 100c will be respectively referred to as user A, user B, and user C below.

FIG. 6 is an explanatory diagram illustrating an example of video distribution setting set in the user information management server 11. The user information management server 11 may store the setting example illustrated in FIG. 6 in a form of a list, database, or the like. The user A makes the appearance of the user A open to the user B and the user C in the distribution setting illustrated in FIG. 6. The user A sets, open to the user B, the appearance whose video has been shot by a camera and a sound recorded by a microphone. Meanwhile, the user A sets, open to the user C, a silhouette converted from the video of the appearance shot by a camera and text converted from the sound recorded by a microphone. The user B then sets the appearance of the user B open to only the user A, and a silhouette converted from a video of the appearance shot by a camera and a sound recorded by a microphone are set open. Meanwhile, the user C sets, open to all users including the users A and B, an avatar converted from a video of the appearance shot by a camera and text converted from a sound recorded by a microphone.

Figure 7:
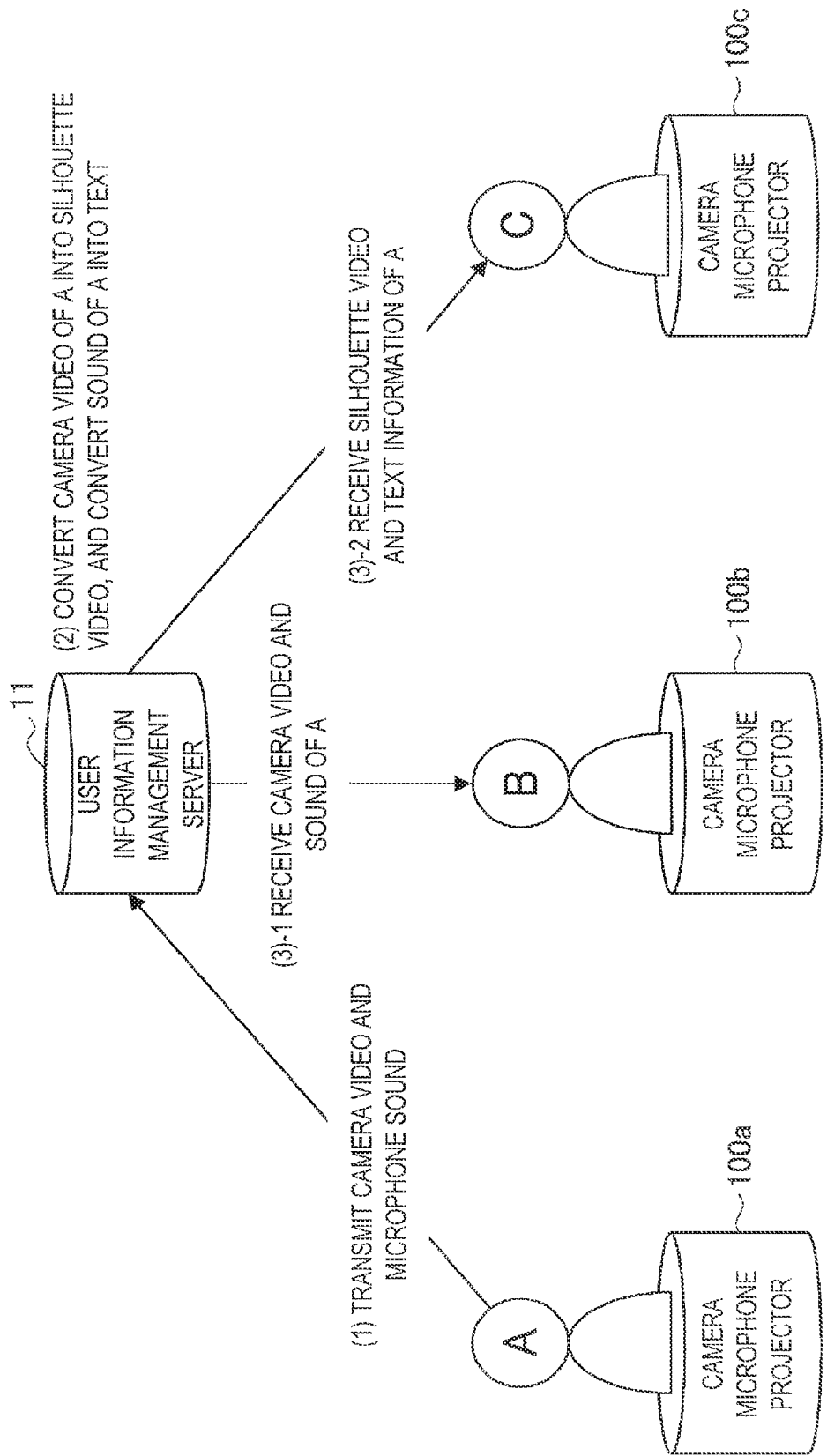

FIG. 7 is an explanatory diagram illustrating that the user information management server 11 distributes a video shot by the display system 100a. The display system 100a sends a video shot by a camera and a sound recorded by a microphone to the user information management server 11. The user information management server 11 extracts only the appearance of the user A from the video transmitted from the display system 100a, and then converts the appearance of the user A appearing in the video transmitted from the display system 100a into a silhouette video and converts the voice of the user A into text. The user information management server 11 outputs the video having the appearance of the user A and the sound of the user A to the display system 100b on the basis of the setting as illustrated in FIG. 6, while outputting the silhouette video converted from the appearance of the user A and the text converted from the sound of the user A to the display system 100c.

Figure 8:
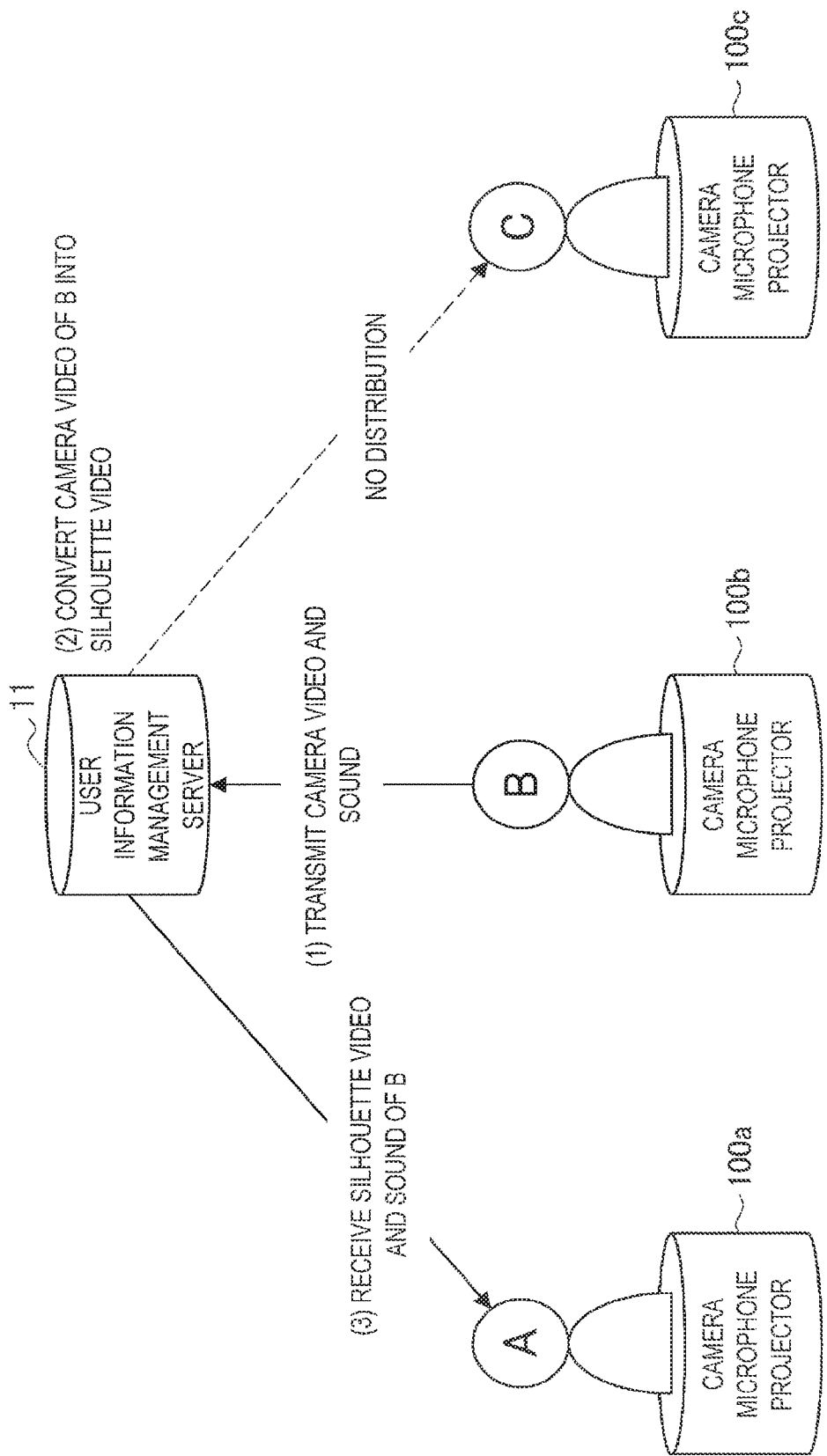
FIG. 8 is an explanatory diagram illustrating that the user information management server 11 distributes a video shot by a display system 100b.

FIG. 8 is an explanatory diagram illustrating that the user information management server 11 distributes a video shot by the display system 100b. The display system 100b sends a video shot by a camera and a sound recorded by a microphone to the user information management server 11. The user information management server 11 extracts only the appearance of the user B from the video transmitted from the display system 100b, and then converts the appearance of the user B appearing in the video transmitted from the display system 100b into a silhouette video. The user information management server 11 outputs the silhouette video converted from the appearance of the user B and the sound of the user B to the display system 100a on the basis of the setting as illustrated in FIG. 6. The user information management server 11 does not output the video transmitted from the display system 100b to the display system 100c.

Figure 9:
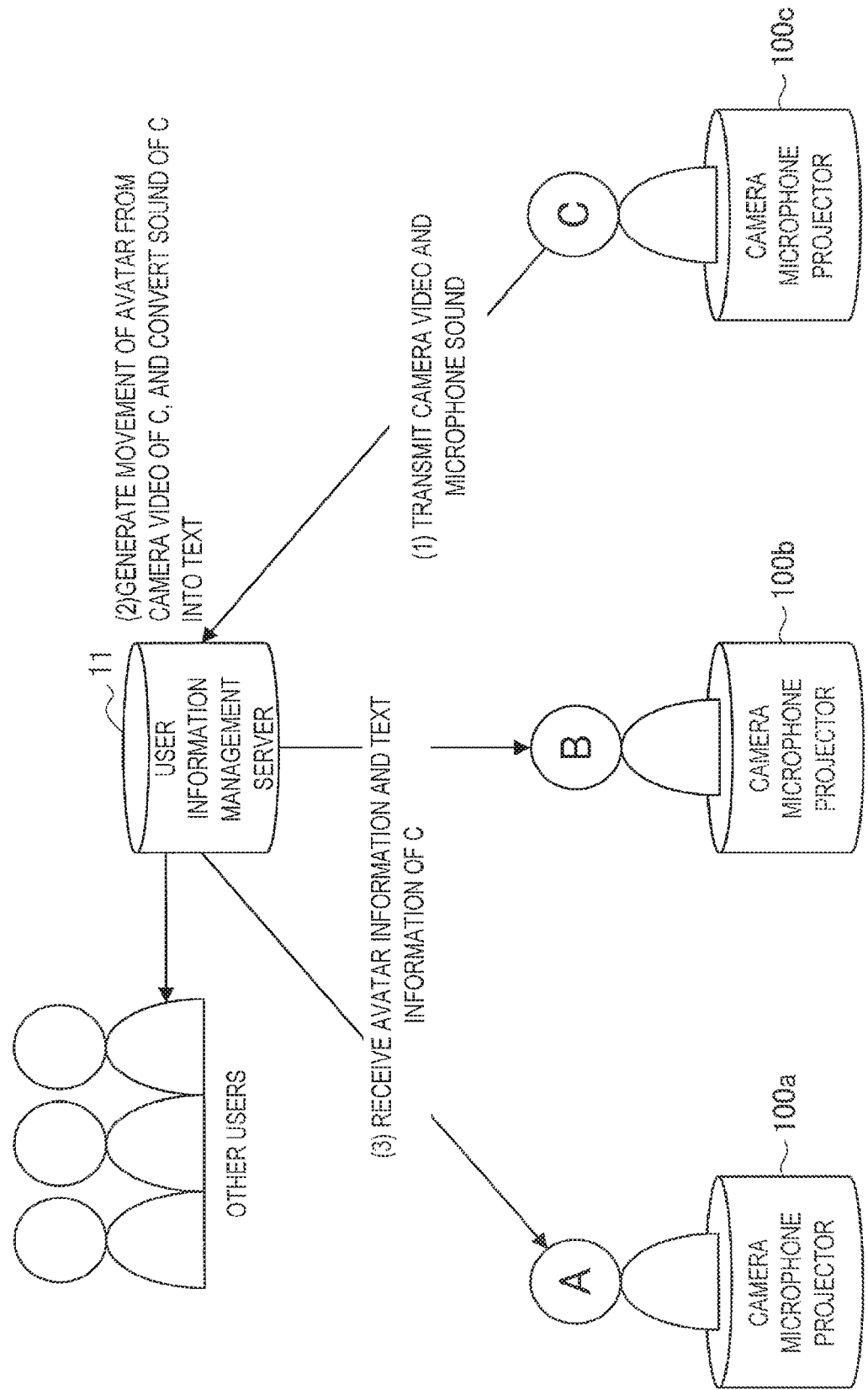
FIG. 9 is an explanatory diagram illustrating that the user information management server 11 distributes a video shot by a display system 100c.

FIG. 9 is an explanatory diagram illustrating that the user information management server 11 distributes a video shot by the display system 100c. The display system 100c sends a video shot by a camera and a sound recorded by a microphone to the user information management server 11. The user information management server 11 extracts only the appearance of the user C from the video transmitted from the display system 100c, and then generates the movement of an avatar from the appearance of the user C appearing in the video transmitted from the display system 100b and converts the voice of the user C into text. The user information management server 11 outputs the avatar generated from the appearance of the user C and the text converted from the sound of the user C to all the display systems 100 including the display systems 100a and 100b on the basis of the setting as illustrated in FIG. 6.

In this way, the user information management server 11 converts and outputs a video from one of the display systems 100 to another display system 100 on the basis of the setting. Registering the privacy setting for a video and a sound in the user information management server 11, a user who is using the display system 100 can decide a user to whom the appearance and voice of the user who is using the display system 100 are output without any processing and a user to whom the converted appearance and voice of the user who is using the display system 100 are output.

FIG. 6 illustrates that the privacy setting is registered for each user, but the user information management server 11 may also allow a user to register the privacy setting in units of groups. In addition, the user information management server 11 may allow a user to register different kinds of setting as the setting for even the same user in accordance with the details of content. For example, when the user A registers the privacy setting regarding baseball for the user B, the user A may set the appearance and voice of the user A to be output to the user B without any processing because the user B is rooting for the same team as a team the user A is rooting for. Meanwhile, when the user A registers the privacy setting regarding soccer, the user A may set a converted appearance and voice of the user A to be output or set none of the appearance and voice of the user A to be output because the user B is rooting for the rival team.

The above describes a communication example in which a large number of people are concurrently trying listening to the same content as illustrated in FIG. 3. The following describes a communication example in which two users are concurrently trying listening to the same content.

Figure 10:
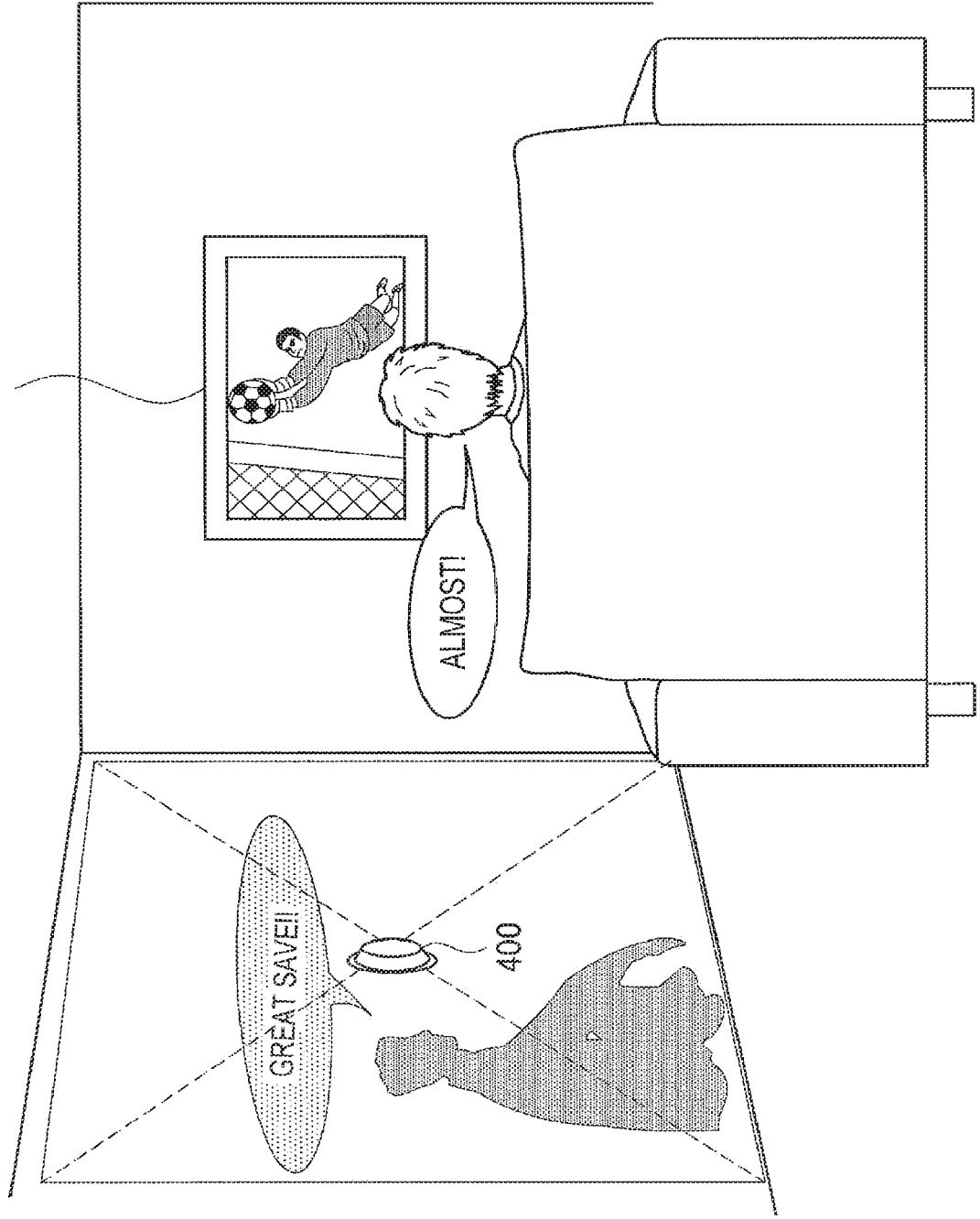
FIG. 10 is an explanatory diagram illustrating an example in which the content display device 300 and the user information output device 400 according to an embodiment of the present disclosure display content and user information.
Figure 11:
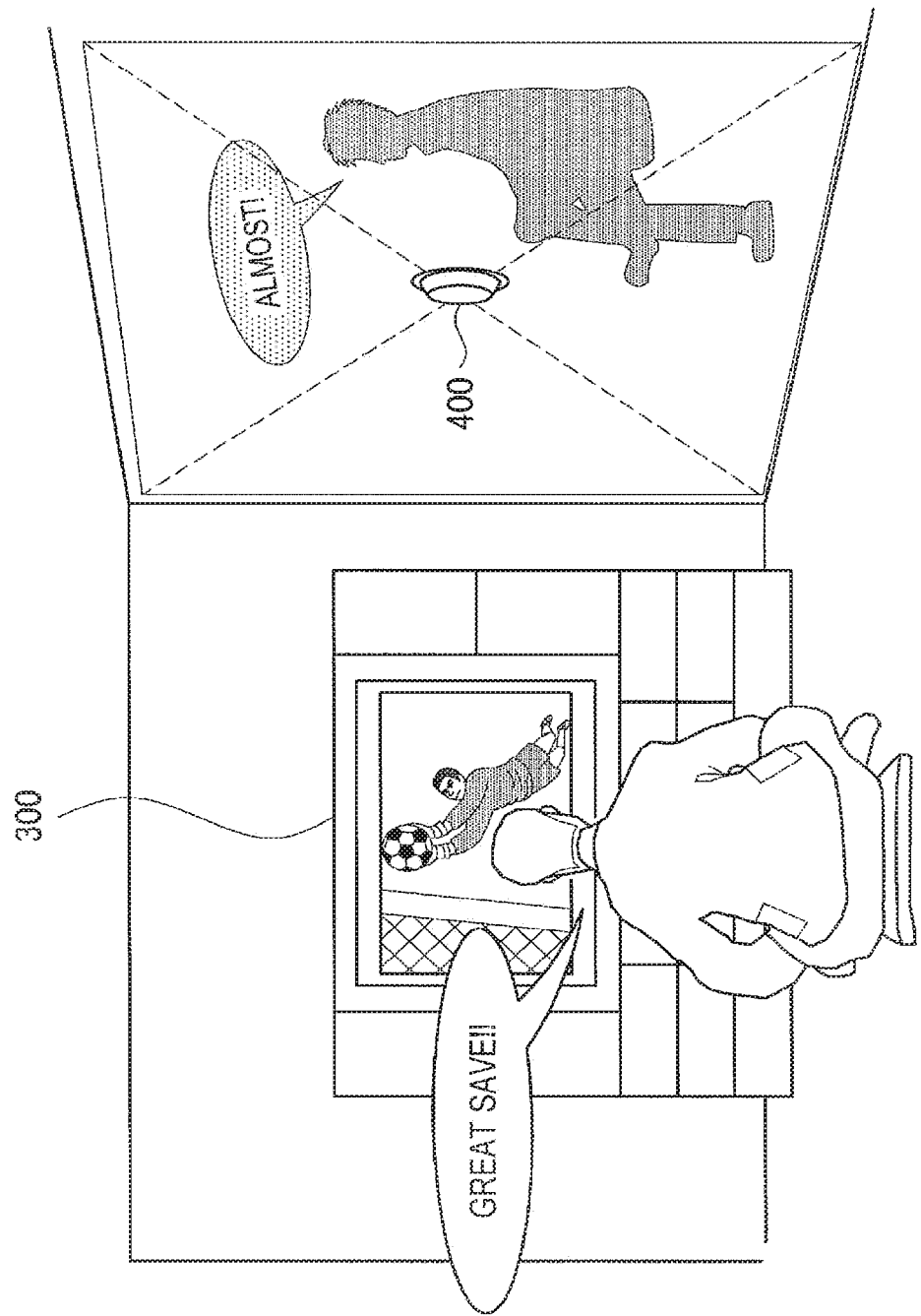
FIG. 11 is an explanatory diagram illustrating an example in which the content display device 300 and the user information output device 400 according to an embodiment of the present disclosure display content and user information.

FIGS. 10 and 11 each are an explanatory diagram illustrating an example in which the content display device 300 and the user information output device 400 according to an embodiment of the present disclosure display content and user information. The content distribution system 1 according to an embodiment of the present disclosure enables communication having a sense of presence between two users who are watching and listening to the same content by retaining a relative positional relationship between the users.

When a user installs the user information output device 400 on the left wall of the user as illustrated in FIG. 10, the user information output device 400 installed on the right wall of a partner user as illustrated in FIG. 11 enables communication while retaining a relative positional relationship between the users.

A video of a single person is shot by a cameral provided on the user information output device 400 in the above example. The content distribution system 1 according to an embodiment of the present disclosure can distribute videos of a plurality of people shot by a camera provided on the user information output device 400 or the like to other users, and display the other users in the same way.

When a camera shoots videos of two or more people, the user information management server 11 may perform image processing of separating the people appearing in the videos one by one. For example, when a plurality of families are concurrently trying listening to the same content, the display control device 200 may exert position control to dispose adults near adults and children near children.

When a camera shoots videos of two or more people, the user information management server 11 may recognize a particular person among the people appearing in the videos and refrain from distributing the particular person to the other users.

The above example describes that the content display device 300 is provided in a room, but the present disclosure is not limited to such an example. When the whole of a wall in a room functions as a display, the content distribution system 1 according to an embodiment of the present disclosure enables communication having a sense of presence between users in the same way.

The above describes an example in which a user tries listening to content displayed on the content display device 300. However, a manner in which a user has a conversation with another user while watching and listening to content is not limited to such an example. For example, even when content is watched and listened to with a head mounted display, which is a display device mounted on the head, communication can be established with a relative positional relationship retained between users.

Figure 12:
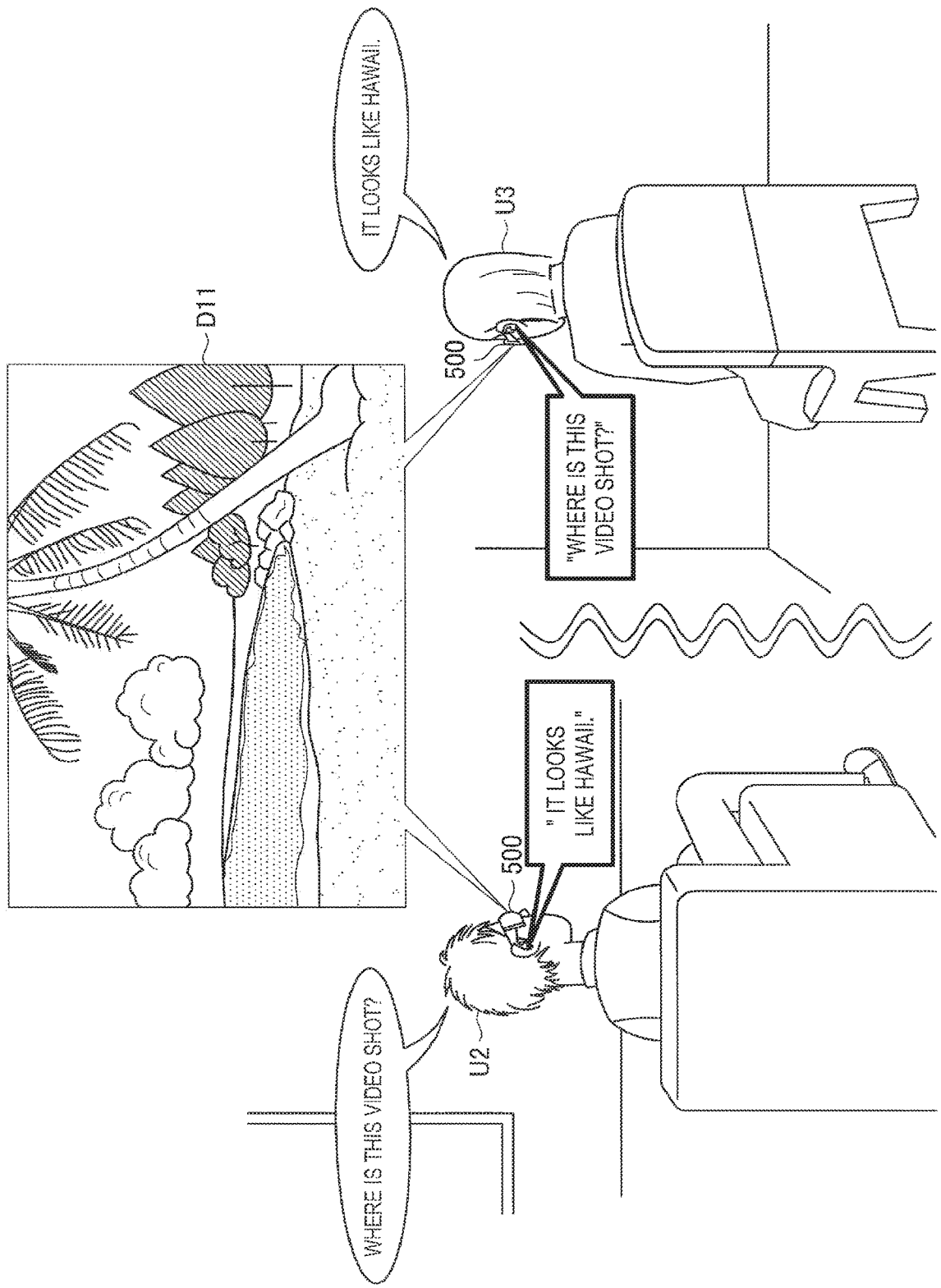
FIG. 12 is an explanatory diagram illustrating an example in which content is watched and listened to with a head mounted display.

FIG. 12 is an explanatory diagram illustrating an example in which content is watched and listened to with a head mounted display. FIG. 12 illustrates that two users U2 and U3 each use a head mounted display 500 to watch and listen to the same content in distant places. A reference sign D11 represent content that the two users U2 and U3 are concurrently watching and listening to, and schematically shows the state of the content displayed on the head mounted display 500. The head mounted display 500 illustrated in FIG. 12 acquires and outputs content output by the content server 10 and user information output by the user information management server 11 from the network 2. Additionally, each head mounted display 500 has the function of the display control device 200 illustrated in FIG. 4B or displays content on the basis of control exerted by the display control device 200.

When the two users U2 and U3 each use the head mounted display 500 to watch and listen to the same content in distant places in this way, the head mounted display 500 used by the user U2 acquires and outputs the voice of the user U3 from the user information management server 11 as if the user U3 sat to the right of the user U2. That is to say, the head mounted display 500 used by the user U2 acquires and outputs the voice of the user U3 from the user information management server 11 in a manner that the user U2 hears the voice of the user U3 from the right ear.

In the same way, the head mounted display 500 used by the user U3 acquires and outputs the voice of the user U2 from the user information management server 11 as if the user U2 sat to the left of the user U3. That is to say, the head mounted display 500 used by the user U3 acquires and outputs the voice of the user U2 from the user information management server 11 in a manner that the user U3 hears the voice of the user U2 from the left ear.

The user U2 speaks "WHERE IS THIS VIDEO SHOT?" in the example illustrated in FIG. 12, and the speech is then sent to the user information management server 11. The head mounted display 500 used by the user U3 acquires and outputs the voice of the user U2 "WHERE IS THIS VIDEO SHOT?" from the user information management server 11 as if the user U2 sat to the left of the user U3.

The user U 3 speaks "IT LOOKS LIKE HAWAII." in response to the inquiry from the user U2, and the speech is then sent to the user information management server 11. The head mounted display 500 used by the user U2 acquires and outputs the voice of the user U3 "IT LOOKS LIKE HAWAII." from the user information management server 11 as if the user U3 sat to the right of the user U2.

The head mounted display 500 acquires and outputs sounds from the user information management server 11 in this way to allow both the users to know a relative positional relationship, so that the head mounted display 500 enables communication while retaining the relative positional relationship between users.

If the head mounted display 500 includes a sensor such as an acceleration sensor, the head mounted display 500 can display content in accordance with the movement of the head of a user who wears the head mounted display 500. For example, when a user who wears the head mounted display 500 looks right, the head mounted display 500 may, for example, shifts the display of content in the left direction and the appearance or an avatar of another user on the remaining space.

Figure 13:
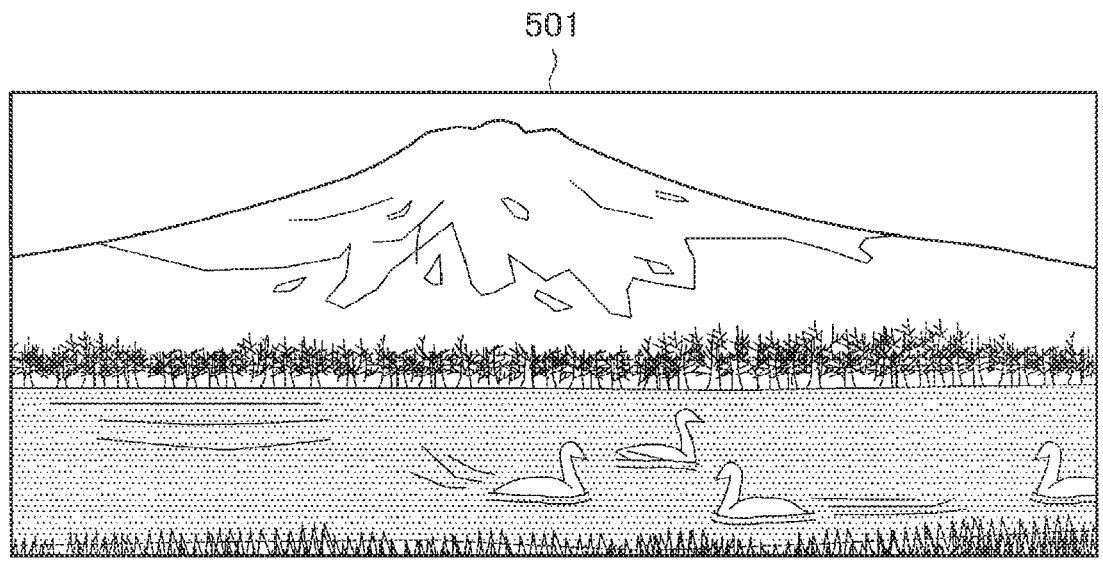
FIG. 13 is an explanatory diagram illustrating a display example of a head mounted display 500.
Figure 14:
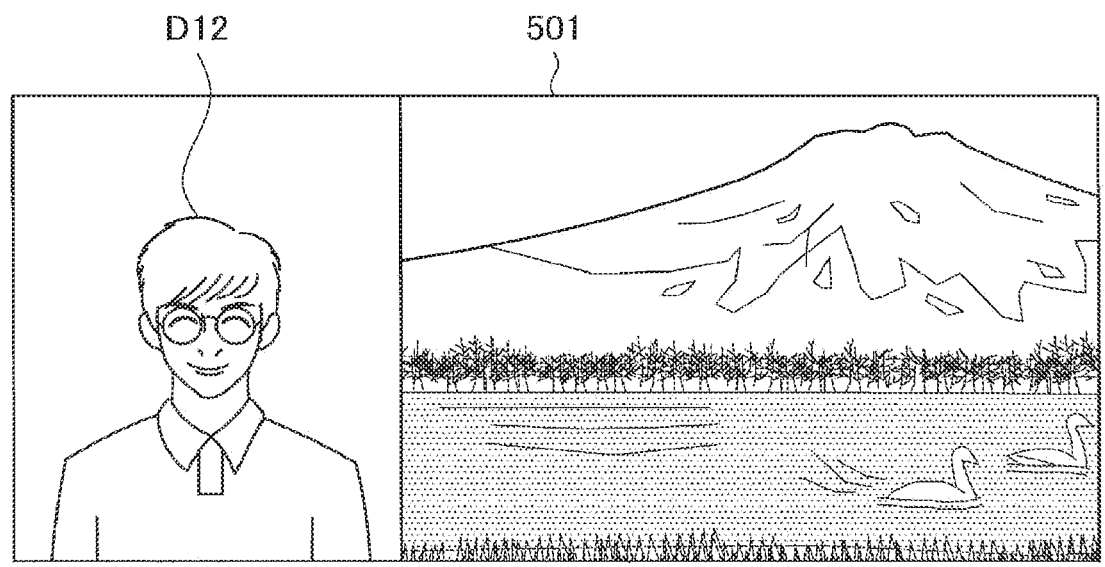
FIG. 14 is an explanatory diagram illustrating a display example of the head mounted display 500.

FIGS. 13 and 14 each are an explanatory diagram illustrating a display example of the head mounted display 500. A reference sign 501 in FIGS. 13 and 14 represents an example of a picture seen by the eyes of a user who wears the head mounted display 500.

FIG. 13 illustrates an example of a picture seen by the eyes of a user who is wearing the head mounted display 500 and looks ahead. Meanwhile, FIG. 14 illustrates an example of a picture seen by the eyes of a user who is wearing head mounted display 500 and looks left from FIG. 13.

When a user looks left, the head mounted display 500 shifts and displays a picture that has been displayed so far in the right direction and displays information (avatar D12 in the example illustrated in FIG. 14) on another user output by the user information management server 11 on the remaining space. The head mounted display 500 displays content and information on another user in this way, thereby enabling communication while retaining a relative positional relationship between the users.

Needless to say, information to be displayed on the remaining space is not limited to avatars. This will be described with the example illustrated in FIG. 12. For example, when the user U2 speaks "WHERE IS THIS VIDEO SHOT?," the user information management server 11 may convert the speech into text information and the text information may be transmitted to the head mounted display 500 used by the user U3 from the user information management server 11 in a manner that the text information "WHERE IS THIS VIDEO SHOT?" is displayed.

2. Hardware Configuration Example

Figure 15:
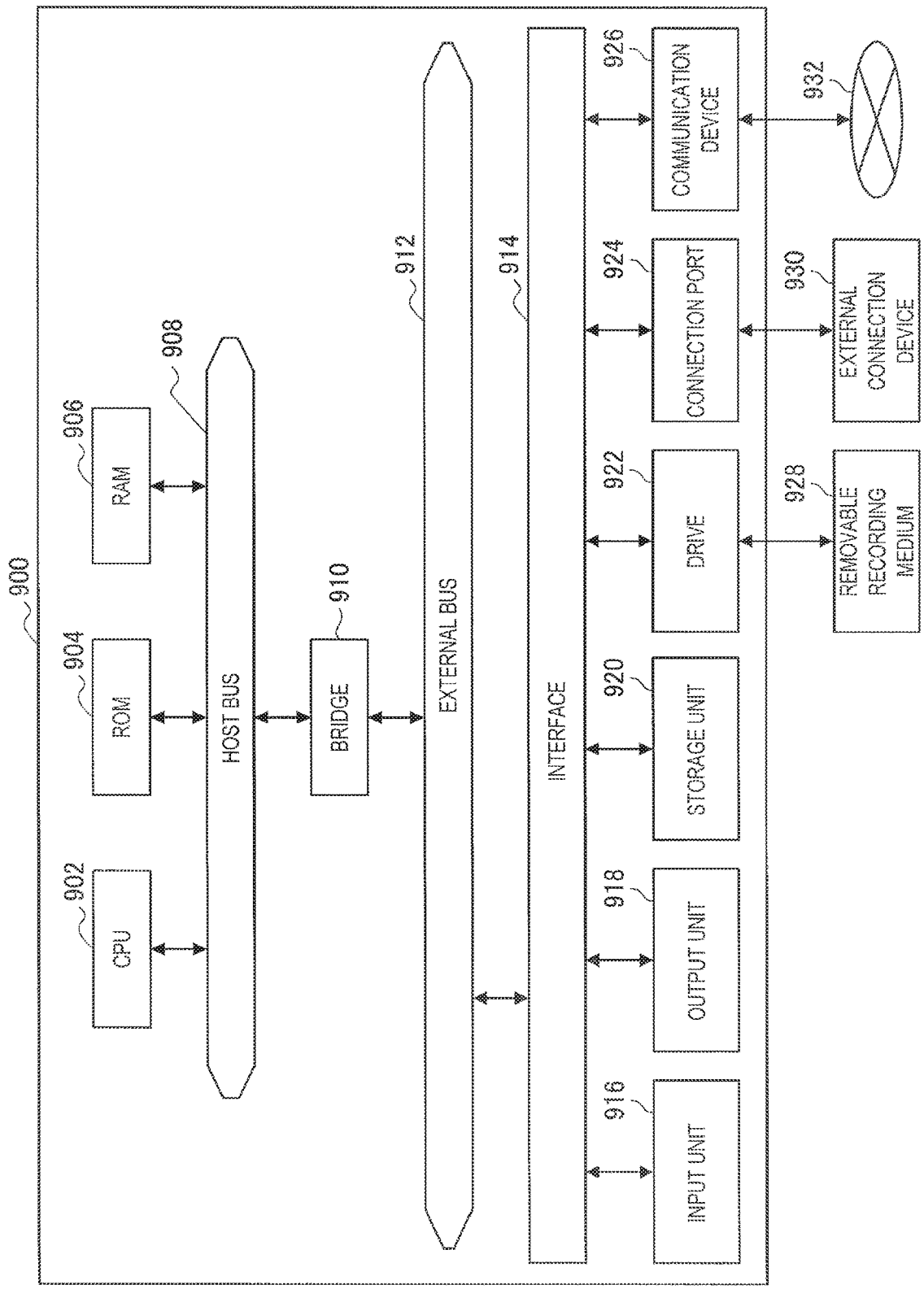
FIG. 15 is an explanatory diagram illustrating a hardware configuration example of the display control device 200.

The above operation of the display control device 200 can be executed, for example, with the hardware configuration of the information processing device illustrated in FIG. 15. That is to say, the hardware illustrated in FIG. 15 may be controlled with a computer program to execute the operation of the display control device 200. Additionally, the hardware may be implemented in any manner. Examples of the hardware include a personal computer, a mobile phone, a PHS, a portable information terminal such as a PDA, a game console, a contact or contactless IC chip, a contact or contactless IC card, and a variety of information appliances. Note that the PHS stands for a personal handy-phone system. Meanwhile, the PDA stands for a personal digital assistant.

As illustrated in FIG. 15, this hardware chiefly includes a CPU 902, ROM 904, RAM 906, a host bus 908, and a bridge 910. This hardware further includes an external bus 912, an interface 914, an input unit 916, an output unit 918, a storage unit 920, a drive 922, a connection port 924, and a communication unit 926. Note that the CPU stands for a central processing unit. Meanwhile, the ROM stands for read only memory. The RAM then stands for random access memory.

The CPU 902 functions, for example, as an operation processing device or a control device, and controls the whole or partial operation of each structural element on the basis of a variety of programs recorded in the ROM 904, the RAM 906, the storage unit 920, or a removable recording medium 928. The ROM 904 is means for storing, for example, a program to be read by the CPU 902 and data used for operations. The RAM 906 temporarily or permanently stores, for example, a program to be read by the CPU 902 and a variety of parameters that vary as appropriate when the program is executed.

These structural elements are connected to each other, for example, via the host bus 908 capable of high-speed data transmission. Meanwhile, the host bus 908 is connected, for example, to the external bus 912 having relatively low-speed data transmission via the bridge 910. For example, a mouse, a keyboard, a touch panel, a button, a switch, and a lever are used as the input unit 916. Furthermore, a remote controller (which will be referred to as remote control below) capable of transmitting a control signal with an infrared ray or other radio waves is used in some cases as the input unit 916.

Examples of the output unit 918 includes a display device such as a CRT, an LCD, a PDP and an ELD, an audio output device such as a speaker and a headphone, a device such as a printer, a mobile phone, and a facsimile capable of visually or aurally notifying a user of acquired information. Note that the CRT stands for a cathode ray tube. The LCD stands for a liquid crystal display. The PDP then stands for a plasma display panel. Furthermore, the ELD stands for an electroluminescence display.

The storage unit 920 is a device for storing various kinds of data. For example, a magnetic storage device such as a hard disk drive (HDD), a semiconductor storage device, an optical storage device, or a magneto-optical storage device is used as the storage unit 920. Note that the HDD stands for a hard disk drive.

The drive 922 is a device that reads out information recorded in the removable recording medium 928 such as a magnetic disk, an optical disc, a magneto-optical disk and semiconductor memory, or writes information into the removable recording medium 928. Examples of the removable recording medium 928 include DVD media, Blu-ray media, HD DVD media, and a variety of semiconductor storage media. Needless to say, the removable recording medium 928 may also be, for example, an IC card or an electronic device having a contactless IC chip mounted thereon. Note that the IC stands for an integrated circuit.

Examples of the connection port 924 include a USB port, an IEEE 1394 port, an SCSI, an RS-232C port, and an optical audio terminal that connect the external connection device 930. Examples of the external connection device 930 include a printer, a portable music player, a digital camera, a digital video camera, and an IC recorder. Note that the USB stands for a universal serial bus. Meanwhile, the SCSI stands for a small computer system interface.

The communication unit 926 is a communication device for a connection to a network 932, and examples of the communication unit 926 include a wired or wireless LAN, Bluetooth (registered trademark), a WUSB communication card, an optical communication router, an ADSL router, and a contact or contactless communication device. The network 932, which is connected to the communication unit 926, includes a network that establishes a wired or wireless connection such as the Internet, a home LAN, infrared communication, visible light communication, and broadcast or satellite communication. Note that the LAN stands for a local area network. The WUSB then stands for a wireless USB. Meanwhile, the ADSL stands for an asymmetric digital subscriber line.

3. Conclusion

According to an embodiment of the present disclosure as described above, the content distribution system 1 is provided that allows users who are concurrently watching and listening to content to know the scale of the users with each, and allows the users to smoothly communicate with the other users.

The above describes an embodiment in which the content server 10 and the user information management server 11 are separate servers, but the present disclosure is not limited to such an example. The same device may have the function of outputting content and the function of managing user information.

The above also describes an embodiment in which the display system 100 includes the display control device 200, which controls the content display device 300 displaying content and the user information output device 400 outputting information, but the present disclosure is not limited to such an example.

For example, the content display device 300 may have the function of the display control device 200, and the content display device 300 may control the content display device 300 displaying content and the user information output device 400 outputting information.

The above describes an example in which the content display device 300, which displays content output from the content server 10, is a display located in a room, but the present disclosure is not limited to such an example.

Content output from the content server 10 may be radiated and displayed on a wall of the room in which a user who is using the display system 100 is in the same way as the appearance of another user is done. In such a case, the content display device 300 may be implemented as a projector or a combination of a display with a projector.

The respective steps in the processing executed by each device described herein do not necessarily have to be performed chronologically in the order described in a sequence diagram or a flowchart. For example, the respective steps in the processing executed by each device may be performed in order different from the order described in the flowcharts, or may be performed in parallel.

It is also possible to fabricate a computer program for causing hardware such as the CPU, ROM, and RAM built in each device to implement the same functions as those of the structural elements of each device. It is also possible to provide a storage medium having the computer program stored therein. The respective functional blocks described in the functional block diagram are configured with hardware, thereby allowing the series of processing to be implemented by the hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the user information output device 400 displays the appearances D1 and D2 of other users to the right and left of the user U1 in the example illustrated in FIG. 3, but the present disclosure is not limited to such an example. The user information output device 400 may also display the appearances D1 and D2 of other users at the front (in the direction in which the content display device 300 is installed) or the back (in the direction opposite to the direction in which the content display device 300 is installed) as viewed from the user U1. The user information output device 400 may output the appearances D1 and D2 of other users on the wall at the back of the content display device 300, or output them on an object other than the wall. Additionally, the present technology may also be configured as below.

(1)

A display control device including:

a user information acquisition unit configured to acquire information on presence of one or more users who are using same content as output content;

a user position decision unit configured to decide display positions of the presence of the users with the information on the presence of the users acquired by the user information acquisition unit; and a display control unit configured to exert control to display the information on the presence of the users on the basis of the display positions decided by the user position decision unit in a manner that the users appear to be using the content together.

(2)

The display control device according to (1), wherein the display control unit exerts control to display the information on the presence of the users without preventing the content from being displayed, and the content.

(3)

The display control device according to (2), wherein the user position decision unit decides positions at which the presence of the one or more users is displayed, on the basis of positions of the users who are using the output content.

(4)

The display control device according to any of (1) to (3), wherein the display control unit exerts control to display the presence of the one or more users on the basis of registered setting information.

(5)

The display control device according to (4), wherein the display control unit outputs silhouette videos as the presence of the one or more users.

(6)

The display control device according to (4), wherein the display control unit outputs avatar images of the one or more users as the presence of the users.

(7)

The display control device according to (4), wherein the display control unit outputs shot videos of the one or more users as the presence of the users.

(8)

The display control device according to (4), wherein the display control unit outputs letter information converted from audio information input by the one or more users as the presence of the users.

(9)

The display control device according to (4), wherein the display control unit outputs audio information input by the one or more users as the presence of the users.

(10)
The display control device according to (1), wherein the display control unit exerts control to display the presence of the one or more users in accordance with a change in a situation in the output content.

(11)
The display control device according to any of (1) to (10), wherein the display control unit selects content of information on a presence of a first user on the basis of registered setting information, the content of the information being distributed from the first user.

(12)
The display control device according to (11), wherein the display control unit exerts control in a manner that a shot video of the first user is distributed as the content of the information on the presence of the first user, the content of the information being distributed from the first user.

(13)
The display control device according to (11), wherein the display control unit exerts control in a manner that a silhouette video of the first user is distributed as the content of the information on the presence of the first user, the content of the information being distributed from the first user.

(14)
The display control device according to (11), wherein the display control unit exerts control in a manner that letter information input by the first user is distributed as the content of the information on the presence of the first user, the content of the information being distributed from the first user.

(15)
The display control device according to (11), wherein the display control unit exerts control in a manner that audio information input by the first user is distributed as the content of the information on the presence of the first user, the content of the information being distributed from the first user.

(16)
The display control device according to any of (1) to (15), wherein the display control unit exerts control to display the information on the presence of the users in accordance with changes in postures of the users using the output content.

(17)
A display control method including:
acquiring information on presence of one or more users who are using same content as output content;
deciding display positions of the presence of the users with the acquired information on the presence of the users; and
exerting control on the basis of decided display positions to display the information on the presence of the users in a manner that the users appear to be using the content together.

(18)
A computer program for causing a computer to execute:
acquiring information on presence of one or more users who are using same content as output content;
deciding display positions of the presence of the users with the acquired information on the presence of the users; and
exerting control on the basis of decided display positions to display the information on the presence of the users in a manner that the users appear to be using the content together.

(19)
A display control device including:
a user information acquisition unit configured to acquire information on presence of one or more users who are using same content as output content; and
a display control unit configured to exert control to display the information on the presence of the users in a manner that the users appear to be using the content together and the output content is not prevented from being displayed.

REFERENCE SIGNS LIST

1 content distribution system
10 content server
11 user information management server
21 video acquisition unit
22 video processing unit
23 information distribution unit
24 setting retention unit
100, 100a, 100b, 100c display system
200 display control device
210 content acquisition unit
220 user information acquisition unit
230 user position decision unit
240 display control unit
300 content display device
400 user information output device

What is claimed is:
1. A control device, comprising:
circuitry configured to:
  acquire first information of presence of a plurality of users that utilizes same content as output content in virtual space;
  acquire second information of a direction of each user of the plurality of users in real space, wherein the second information is acquired through a head-mounted display associated with a respective user of the plurality of users;
  determine at least two avatars of a plurality of avatars in the virtual space based on the first information, wherein the plurality of avatars corresponds to the plurality of users;
  determine a direction of each of the at least two avatars in the virtual space based on the second information;
  control the direction of each of the at least two avatars in the virtual space, wherein the direction of each of the at least two avatars is controlled such that the at least two avatars appear to view the output content in the virtual space;
  control movements of the at least two avatars in the virtual space based on movements of at least two users of the plurality of users in the real space, wherein
  the movements of the at least two avatars in the virtual space is controlled to reflect the movements of the at least two users of the plurality of users in the real space, and
  the at least two users correspond to the at least two avatars; and
  set display positions of the at least two avatars in the virtual space in order of increasing heights of the at least two users.

2. The control device according to claim 1, wherein
a first avatar of the plurality of avatars corresponds to a first user of the plurality of users,
a second avatar of the plurality of avatars corresponds to a second user of the plurality of users,
the circuitry is further configured to change a display position of the second avatar with respect to a display position of the first avatar based on an actual distance between the first user and the second user, and
the first user is associated with the control device.

3. The control device according to claim 2, wherein the circuitry is further configured to change display positions of the plurality of avatars with respect to the first avatar in the virtual space in order of increasing actual distance of respective users of the plurality of users from the first user.

4. The control device according to claim 1, wherein the circuitry is further configured to determine a plurality of display positions of the plurality of avatars in the virtual space based on third information associated with communication services.

5. The control device according to claim 4, wherein the communication services comprise social networking services (SNS) and social networking sites.

6. The control device according to claim 5, wherein the circuitry is further configured to:
   estimate a level of intimacy of a first user of the plurality of users with a second user of the plurality of users based on a social graph of the SNS; and
   determine a display position, of the plurality of display positions, of a first avatar corresponding to the first user with respect to a second avatar corresponding to the second user in the virtual space,
      wherein the determination of the display position of the first avatar is based on the estimated level of intimacy of the first user with the second user.

7. The control device according to claim 6, wherein the display position of the first avatar is closer to the second avatar among the plurality of avatars based on the estimated level of intimacy that indicates that the first user has a deep intimacy with the second user.

8. The control device according to claim 1, wherein
   a first avatar of the plurality of avatars corresponds to a first user of the plurality of users,
   the circuitry is further configured to display a first set of avatars, of the plurality of avatars, closer to the first avatar based on a determination that a first set of users of the plurality of users leaves a specific amount of messages,
   the first set of users corresponds to the first set of avatars, and
   the first user is associated with the control device.

9. The control device according to claim 8, wherein
   the circuitry is further configured to display a second set of avatars, of the plurality of avatars, away from the first avatar based on a determination that a second set of users of the plurality of users leaves one of less than or equal to a threshold amount of messages within a specific time,
   the second set of users corresponds to the second set of avatars, and
   the second set of users is different from the first set of users.

10. The control device according to claim 1, wherein the circuitry is further configured to acquire, from an external device, third information of a position of each user of the plurality of users in the real space.

11. The control device according to claim 1, wherein the circuitry is further configured to:
   acquire privacy settings from an external device, wherein the external device registers the privacy settings for each user of the plurality of users based on a user input; and
   control display of the plurality of avatars in the virtual space based on the privacy settings.

12. The control device according to claim 1, wherein the circuitry is further configured to:
   receive the output content from a content server; and
   determine a plurality of positions of the plurality of avatars in the virtual space based on details of the received output content.

13. The control device according to claim 1, wherein
   the output content is a game,
   a first avatar of the plurality of avatars corresponds to a first user of the plurality of users,
   the first user is associated with the control device,
   the circuitry is further configured to determine a display position of a first set of avatars of the plurality of avatars with respect to a second set of avatars of the plurality of avatars in the virtual space, such that the first set of avatars and the first avatar are displayed on a first side and the second set of avatars is displayed on a second side opposite to the first side,
   the first set of avatars corresponds to a first set of users of the plurality of users,
   the second set of avatars corresponds to a second set of users of the plurality of users,
   the display position of the first set of avatars is determined based on a determination that the first set of users is rooting for a same team in the game as the first user, and
   the second set of users is rooting for an opponent team in the game.

14. The control device according to claim 1, wherein the circuitry is further configured to display the plurality of avatars, of the plurality of users, in the virtual space based on a situation in the output content.

15. A control method, comprising:
   in a control device:
      acquiring first information of presence of a plurality of users that utilizes same content as output content in virtual space;
      acquiring second information of a direction of each user of the plurality of users in real space, wherein the second information is acquired through a head-mounted display associated with a respective user of the plurality of users;
      determining at least two avatars of a plurality of avatars in the virtual space based on the first information, wherein the plurality of avatars corresponds to the plurality of users;
      determining a direction of each of the at least the two avatars in the virtual space based on the second information;
      controlling the direction of each of the at least two avatars in the virtual space, wherein the direction of each of the at least two avatars is controlled such that the at least two avatars appear to view the output content in the virtual space;
      controlling movements of the at least two avatars in the virtual space based on movements of at least two users of the plurality of users in the real space, wherein
         the movements of the at least two avatars in the virtual space is controlled to reflect the movements of the at least two users of the plurality of users in the real space, and
         the at least two users correspond to the at least two avatars; and
      setting display positions of the at least two avatars in the virtual space in order of increasing heights of the at least two users.

16. The control method according to claim 15, further comprising:
- receiving the output content from a content server; and
- determining a plurality of display positions of the plurality of avatars in the virtual space based on details of the received output content.

17. The control method according to claim 15, wherein the output content is a game,
- a first avatar of the plurality of avatars corresponds to a first user of the plurality of users,
- the first user is associated with the control device,
- the control method further comprising determining a display position of a first set of avatars of the plurality of avatars with respect to a second set of avatars of the plurality of avatars in the virtual space, such that the first set of avatars and the first avatar are displayed on a first side and the second set of avatars is displayed on a second side opposite to the first side,
- the first set of avatars corresponds to a first set of users of the plurality of users,
- the second set of avatars corresponds to a second set of users of the plurality of users,
- the display position of the first set of avatars is determined based on a determination that the first set of users is rooting for a same team in the game as the first user, and
- the second set of users is rooting for an opponent team in the game.

18. The control method according to claim 16, further comprising:
- estimating a level of intimacy of a first user of the plurality of users with a second user of the plurality of users based on a social graph of a social networking service (SNS); and
- determining a display position, of the plurality of display positions, of a first avatar corresponding to the first user with respect to a second avatar corresponding to the second user in the virtual space,
  - wherein the determination of the display position of the first avatar is based on the estimated level of intimacy of the first user with the second user.

19. A non-transitory computer-readable medium having stored thereon computer-executable instructions, which when executed by a processor of a control device, cause the processor to execute operations, the operations comprising:
- acquiring first information of presence of a plurality of users that utilizes same content as output content in virtual space;
- acquiring second information of a direction of each user of the plurality of users in real space, wherein the second information is acquired through a head-mounted display associated with a respective user of the plurality of users;
- determining at least two avatars of a plurality of avatars in the virtual space based on the first information, wherein the plurality of avatars corresponds to the plurality of users;
- determining a direction of each of the at least two avatars in the virtual space based on the second information;
- controlling the direction of each of the at least two avatars in the virtual space, wherein the direction of each of the at least two avatars is controlled such that the at least two avatars appear to view the output content in the virtual space;
- controlling movements of the at least two avatars in the virtual space based on movements of at least two users of the plurality of users in the real space, wherein
  - the movements of the at least two avatars in the virtual space is controlled to reflect the movements of the at least two users of the plurality of users in the real space, and
  - the at least two users correspond to the at least two avatars; and
- setting display positions of the at least two avatars in the virtual space in order of increasing heights of the at least two users.

20. The control device according to claim 1, wherein
- the circuitry is further configured to control display of text data along with an avatar of the at least two avatars,
- the text data corresponds to a sound uttered by a user of the at least two users, and
- the user corresponds to the avatar.

* * * * *